(12) United States Patent  
Maity et al.

(10) Patent No.: US 12,448,346 B1  
(45) Date of Patent: Oct. 21, 2025

(54) CATALYTIC METHOD FOR ACRYLATE PRODUCTION

(71) Applicant: KING FAHD UNIVERSITY OF PETROLEUM AND MINERALS, Dhahran (SA)

(72) Inventors: Niladri Maity, Dammam (SA); Samir Barman, Dammam (SA); Zainab Al-Mansaf, Al-ahasa (SA); Nabil Al-Yassir, Al-khobar (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/242,597

(22) Filed: Jun. 18, 2025

(51) Int. Cl.
| | |
|---|---|
| *C07C 51/41* | (2006.01) |
| *B01J 27/185* | (2006.01) |
| *C07C 7/20* | (2006.01) |
| *C07C 51/09* | (2006.01) |
| *C07C 67/055* | (2006.01) |
| *C07F 15/00* | (2006.01) |

(52) U.S. Cl.
CPC .............. *C07C 51/41* (2013.01); *B01J 27/185* (2013.01); *C07C 7/20* (2013.01); *C07C 51/09* (2013.01); *C07C 67/055* (2013.01); *C07F 15/0066* (2013.01)

(58) Field of Classification Search
CPC ....... C07C 51/09; C07C 51/41; C07C 67/055; C07C 69/54; C07F 15/0066; B01J 27/185
See application file for complete search history.

(56) References Cited

U.S. PATENT DOCUMENTS

2011/0213052 A1   9/2011  Hill et al.
2017/0217869 A1*  8/2017  Limbach .............. B01J 31/2409
(Continued)

OTHER PUBLICATIONS

Lejkowski, M.L., et al., The first catalytic synthesis of an acrylate from CO2 and an alkene—A rational approach, Chemistry A European Journal, vol. 18, issue 44, pp. 14017-14025 (Year: 2012).*

(Continued)

*Primary Examiner* — Yate' K Cutliff
(74) *Attorney, Agent, or Firm* — Oblon, McClelland, Maier &Neustadt, L.L.P.

(57) ABSTRACT

A method of acrylate salt production includes reacting ethylene gas in the presence of a metal precursor solution including a base, an additive, a metal precursor, a solvent and a ligand, in an autoclave, to form a metal complex intermediate solution. Further, $CO_2$ reacts with the metal complex intermediate solution to form an ester intermediate solution, which is reacted to form an acrylate salt product mixture. The acrylate salt is extracted thereafter. The $CO_2$ is reacted at a temperature in a range from 100° C. to 200° C., where the metal precursor is tetrakis(triphenylphosphine)palladium(0) and the concentration of tetrakis(triphenylphosphine)palladium(0) in the metal precursor solution is in a range from 0.0005M to 0.003M. The additive is sodium formate and the solvent is selected from the group consisting of N-cyclohexyl-2-pyrrolidone, tetrahydrofuran, and combinations thereof. The turnover number is greater than or equal to 100.

20 Claims, 9 Drawing Sheets

(56) References Cited

U.S. PATENT DOCUMENTS

2018/0362436 A1 12/2018 Hlavinka et al.
2020/0115309 A1 4/2020 Iacono et al.
2024/0208892 A1 6/2024 Richmond et al.

OTHER PUBLICATIONS

Manzini, S., et al., Palladium- and Nickel-Catalyzed synthesis of sodium acrylate from ethylene, CO2, and Phenolate bases: optimization of the catalytic system for a potential process, European Journal of Organic Chemistry, vol. 2015, issue 32, pp. 7122-7130 (Year: 2015).*

Manzini, S., et al., Synthesis of acrylates from olefins and CO2 using sodium alkoxides as bases, Catalyst Today, vol. 281, Part 2, pp. 379-386 (Year: 2017).*

Andrea Vavasori, et al., "The coupling of carbon dioxide with ethene to produce acrylic acid sodium salt in one pot by using Ni(II) and Pd(II)-phosphine complexes as precatalysts", Pure and Applied Chemistry 2018, vol. 90, Issue 2, pp. 315-326.

Manuela Hollering, et al., "Transition metal mediated coupling of carbon dioxide and ethene to acrylic acid/acrylates", Coordination Chemistry Reviews, vol. 309, Feb. 15, 2016, pp. 51-67.(Abstract).

Bing Yu et al., "Carboxylation of olefins/alkynes with CO2 to industrially relevant acrylic acid derivatives", Journal of CO2 Utilization, vol. 1, Jun. 2013, pp. 60-68.

\* cited by examiner

CATALYTIC METHOD FOR ACRYLATE PRODUCTION

CROSS REFERENCE TO RELATED APPLICATIONS

The present disclosure claims the benefit of Saudi Patent No. 1020254117, filed Jun. 11, 2025, with the Saudi Authority for Intellectual Property Office, which is incorporated herein by reference in its entirety.

BACKGROUND

Technical Field

The present disclosure relates to homogeneous catalysis, and more particularly to a catalytic processes for the conversion of carbon dioxide ($CO_2$) and olefins into value-added compounds such as acrylate salt through transition metal-mediated carbon-carbon (C—C) bond formation.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

The catalytic insertion of carbon dioxide into olefinic double bonds for creation of value-added products has been a focal point of research for several decades, primarily due to a potential of $CO_2$ as a sustainable C1 feedstock. A milestone in the utilization of $CO_2$ was the elucidation of the metallalactone structure, where carbon dioxide undergoes oxidative C—C coupling with olefins [Yamamoto, T., et al., Preparation and properties of phosphine complexes of nickel-containing cyclic amides and esters [$(PR_3)_n NICH_2CH(R_1)COZ(Z=NR_2, O)$], *J. Am. Chem. Soc.* 1980, 102, 25, 7448-7456]. This discovery marked a pivotal advancement in the activation and functionalization of carbon dioxide.

Subsequent developments in the same field substantially extended the foundational work by studying the catalytic cycle that facilitates the formation of acrylic acid and related derivatives via β-hydride elimination and reductive acrylate elimination steps [Hoberg, H. et al., Preliminary communication C—C-verknupfung von alkenen mit coz an Nickel(0); herstellung von zimtsaure aus styrol, *Journal of Organometallic Chemistry*, Volume 307, Issue 2, 1986, Pages C38-C40; Alvarez, R. et al., Formation of Acrylic Acid Derivatives from the Reaction of $CO_2$ with Ethylene Complexes of Molybdenum and Tungsten, *J. Am. Chem. Soc.*, 1985, 107, 19, 5529-5531; Alvarez, R. et al., Formation of carboxylate complexes from the reactions of $CO_2$ with ethylene complexes of molybdenum and tungsten. X-ray and neutron diffraction Studies, *Organometallics*, 1989, 8, 10, 2430-2439; and Galindo, A. et al., Bis(ethylene) Complexes of molybdenum and tungsten and their reactivity toward $CO_2$. New examples of acrylate formation by coupling of ethylene and carbon dioxide, *Organometallics*, 1993, 12, 11, 4443-4451]. The mechanistic insights prompted extensive experimental and computational investigations into augmenting the catalytic cycle, particularly the β-hydride elimination step, which remains a kinetic bottleneck in the reaction pathway [Fischer, R. et al., A key step in the formation of acrylic acid from $CO_2$ and ethylene: The transformation of a nickelalactone into a nickel-acrylate complex, *Chem. Commun.*, 2006, 2510-2512].

A broad spectrum of transition metal catalysts, including but not limited to those based on nickel, palladium, ruthenium, iron, cobalt, rhodium, molybdenum, and tungsten, have been evaluated under varying reaction parameters. Despite these efforts, research suggests that only a limited subset of ligand-supported metal complexes have yielded appreciable turnover numbers (TONs), which are typically required for industrial viability. Notably, catalyst systems employing chelating phosphine ligands with strong electron-donating alkyl substituents on the phosphorus atoms have demonstrated enhanced activity. It has also been observed that ligand backbones including up to three carbon atoms exhibit desirable performance characteristics. Among the catalyst systems reported to date, a combination including [$Pd(PPh_3)_4$], 1,2-bis(dicyclohexylphosphino)ethane (dcpe), N-cyclohexyl-2-pyrrolidone (CHP), and sodium tert-butoxide (NaOtBu) has been identified as one of the most efficient, delivering turnover numbers of about 514 [Manzini, S. et al., Enhanced activity and recyclability of palladium complexes in the catalytic synthesis of sodium acrylate from carbon dioxide and ethylene, *Chem Cat Chem*, 2017, 9, 2269]. However, the foregoing system exhibits inherent limitations in achieving higher catalytic efficiency.

Attempts to address the stated limitation have included the introduction of additives in catalytic systems. Researchers have demonstrated that the inclusion of selected additives alongside strong bases enhanced the catalytic performance of nickel-based bidentate ligand complexes, achieving TONs up to 450, surpassing additive-free systems [K. Takahashi, K. Cho, A. Iwai, T. Ito, N. Iwasawa, Development of N-Phosphinomethyl-Substituted NHC-Nickel(0) Complexes as robust catalysts for acrylate salt synthesis from ethylene and $CO_2$, *Chem. Eur. J.*, 2019, 25, 13504]. Despite this advancement, analogous investigations employing palladium complexes remain largely unexplored.

In view of the aforementioned shortcomings, there exists a compelling requirement to develop improved catalytic systems capable of more efficient $CO_2$ insertion into olefinic substrates. Accordingly, one object of the present disclosure is to provide a method of acrylate salt production, that may circumvent the above specified drawbacks and limitations of the methods known in the art.

SUMMARY

In an exemplary embodiment, a method of acrylate salt production is described. The method includes reacting, in an autoclave, ethylene gas in the presence of a metal precursor solution including a base, an additive, a metal precursor, a solvent and a ligand to form a metal complex intermediate solution. The method further includes reacting, in the autoclave, $CO_2$ with the metal complex intermediate solution at a reaction temperature to form an ester intermediate solution, reacting the ester intermediate solution at the reaction temperature to form an acrylate salt product mixture, and extracting an acrylate salt from the acrylate salt product mixture with water. The reaction temperature is in a range from 100° C. to 200° C., where the metal precursor is tetrakis(triphenylphosphine)palladium(0) and the concentration of tetrakis(triphenylphosphine)palladium(0) in the metal precursor solution is in a range from 0.0005M to 0.003M. The additive is sodium formate and the solvent is selected from the group consisting of N-cyclohexyl-2-pyrrolidone, tetrahydrofuran, and combinations thereof. The turnover number is greater than or equal to 100, where the turnover number is defined as the moles of acrylate salt formed per mole of catalyst.

In some embodiments, the base is sodium tert-butoxide and the sodium tert-butoxide concentration of the metal precursor solution is in a range from 0.3 to 1.4 M.

In some embodiments, the sodium tert-butoxide concentration of the metal precursor solution is in a range from 0.6 to 1.2 M.

In some embodiments, the sodium tert-butoxide concentration of the metal precursor solution is 1 M.

In some embodiments, the additive concentration of the metal precursor solution is in a range from 0.8 to 1.6 M.

In some embodiments, the additive concentration of the metal precursor solution is in a range from 1 to 1.4 M.

In some embodiments, the additive concentration of the metal precursor solution is 1.2 M.

In some embodiments, the concentration of tetrakis(triphenylphosphine)palladium(0) in the metal precursor solution is in a range from 0.00075M to 0.0025M.

In some embodiments, the concentration of tetrakis(triphenylphosphine)palladium(0) in the metal precursor solution is in a range from 0.001M to 0.002M.

In some embodiments, reaction temperature is in a range from 140 to 190° C.

In some embodiments, the reaction temperature is in a range from 175 to 185° C.

In some embodiments, the reaction temperature is maintained for 4 to 30 hours.

In some embodiments, the reaction temperature is maintained for 18 to 24 hours.

In some embodiments, the reaction temperature is maintained for for 20 hours.

In some embodiments, the solvent is N-cyclohexyl-2-pyrrolidone.

In some embodiments, the turnover number is greater than or equal to 200.

In some embodiments, the turnover number is greater than or equal to 300.

In some embodiments, the turnover number is greater than or equal to 390.

In some embodiments, the concentration of tetrakis(triphenylphosphine)palladium(0) in the metal precursor is 0.002 M, the concentration of sodium tert-butoxide in the metal precursor solution is 1 M, the concentration of sodium formate in the metal precursor solution is 1.2 M, and the turnover number is greater than or equal to 340.

In some embodiments, the concentration of tetrakis(triphenylphosphine)palladium(0) in the metal precursor is 0.001 M, the concentration of sodium tert-butoxide in the metal precursor solution is 1 M, the concentration of sodium formate in the metal precursor solution is 1.2 M, and the turnover number is greater than or equal to 395.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
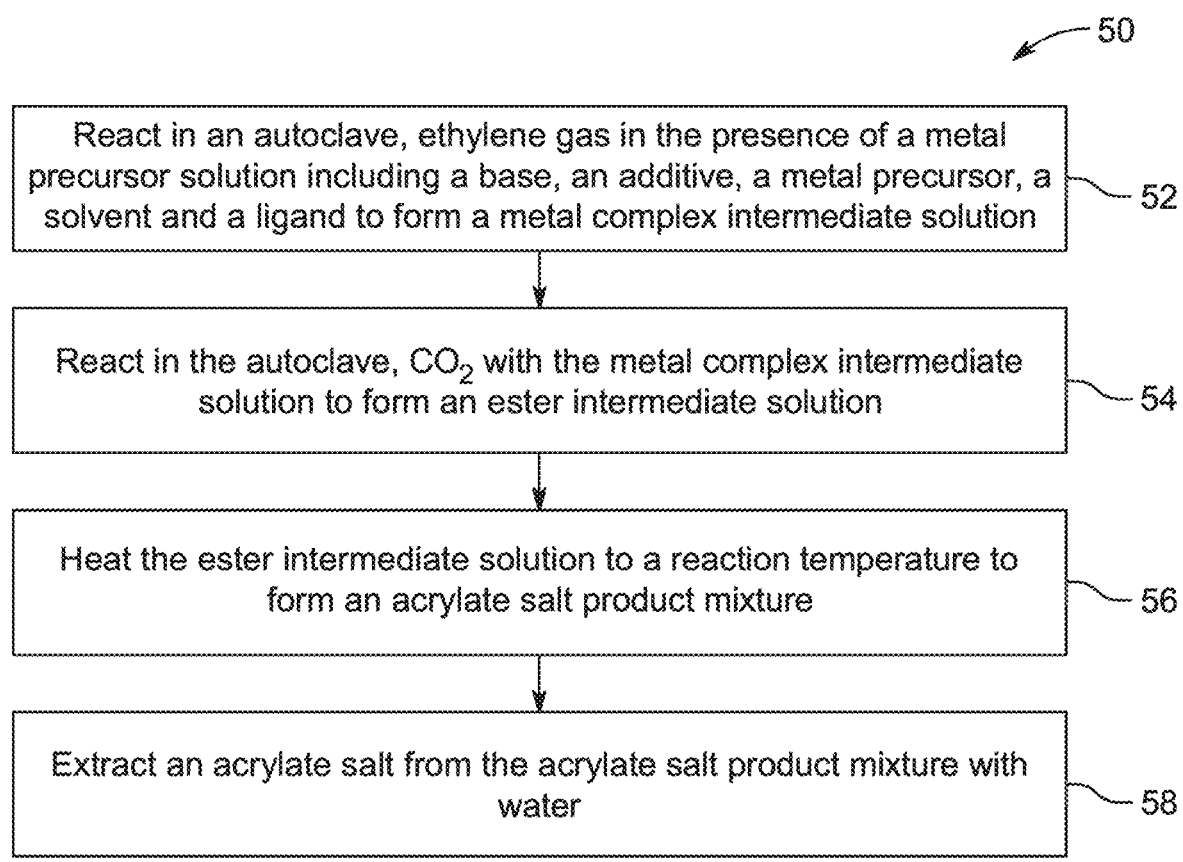
FIG. 1A is an exemplary flow chart of a method of acrylate salt production, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'catalytic oxidative' refers to a chemical process in which a catalyst facilitates the incorporation of an oxidizing agent, such as carbon dioxide, into a substrate—typically involving the formation of new chemical bonds through oxidation reactions under catalytic conditions.

As used herein, the term 'metal precursor solution' refers to a solution including one or more metal-containing compounds, along with optional components such as a base, a ligand, a solvent, and one or more additives, which together serve as a source of metal species for initiating or facilitating a catalytic reaction.

As used herein, the term 'an additive' refers to a component introduced into the reaction mixture to enhance, modify, or stabilize the catalytic activity or reaction outcome, without being consumed as a primary reactant or product in the overall chemical transformation.

As used herein, the term 'ligand' refers to a molecule or ion that coordinates to a central metal atom or ion in a metal complex, typically through one or more donor atoms, and plays a role in influencing the reactivity, selectivity, and stability of the catalytic system.

As used herein, the term 'metal complex intermediate' refers to a transient species formed during the reaction process, including a metal center coordinated with one or more ligands and other reactants or intermediates, which plays a role in facilitating subsequent steps of the catalytic transformation.

As used herein, the term 'ester intermediate solution' refers to a reaction mixture containing one or more ester compounds formed as intermediates during the catalytic process, typically dissolved in a suitable solvent, and capable of undergoing further transformation to yield the desired final product.

As used herein, the term 'turnover number' refers to the number of moles of product formed per mole of catalyst used in a given reaction, serving as a measure of the catalytic efficiency over the course of the reaction.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of palladium occurring in the present compounds and complexes. Isotopes include those atoms having the same atomic number but different mass numbers. By way of general example, and without limitation, isotopes of palladium include $^{102}$Pd, $^{104}$Pd, $^{105}$Pd, $^{106}$Pd, $^{108}$Pd, and $^{110}$Pd. Isotopically-labeled palladium compounds or complexes of the disclosure may generally be prepared by conventional techniques known to those skilled in the art, or by processes analogous to those described herein, using an appropriate isotopically-labeled palladium source in place of the naturally abundant or non-labeled palladium reagent otherwise employed.

An aspect of the present disclosure is directed to enhancing the the catalytic oxidative addition of $CO_2$ into olefinic bonds by employing a mixture of metal/ligand/solvent/base (Pd/dcpe/CHP/NaOtBu) system with additives, wherein sodium formate improves performance, achieving an enhanced turnover number.

FIG. 1A illustrates a schematic flow chart of a method 50 of acrylate salt production. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 involves reacting ethylene gas in an autoclave with a metal precursor solution including a base, an additive, a metal precursor, a solvent, and a ligand to form a metal complex intermediate solution.

In some embodiments, metal precursors may include, but are not limited to Palladium (II) acetate, Palladium (0) cyclooctadiene, Nickel(II) chloride, Nickel(0) cyclooctadiene, Copper (II) sulfate, Iron (III) chloride, Ruthenium (III) chloride, Platinum (II) chloride, Rhodium (III) nitrate, Cobalt (II) acetate, Molybdenum (VI) oxide, Tungsten (VI) oxide, Chromium (III) chloride, Zinc (II) nitrate, Silver nitrate, Gold (III) chloride, Iridium (III) chloride, Osmium tetroxide, Tin (IV) chloride, Lead (II) acetate, Cadmium (II) chloride, Manganese (II) sulfate, Vanadium (V) oxide, Titanium (IV) isopropoxide, Zirconium (IV) chloride, Gallium (III) nitrate, Bismuth (III) nitrate, Indium (III) chloride, Lanthanum (III) chloride, Yttrium (III) nitrate, Neodymium (III) chloride, Hafnium (IV) chloride, and Scandium (III) nitrate. In a preferred embodiment, metal precursors is tetrakis(triphenylphosphine)palladium(0).

In some embodiments, the metal in the tetrakis(triphenylphosphine) complex may include, but is not limited to, platinum, gold, silver, nickel, copper, cobalt, rhodium, ruthenium, iridium, osmium, rhenium, molybdenum, tungsten, cadmium, mercury, lead, bismuth, chromium, manganese, and zinc. In a preferred embodiment, heavy metal in the tetrakis(triphenylphosphine) complex is palladium. In some embodiments, the oxidation state of palladium may be 0, +1, +2, +3, or +4. In a preferred embodiment, oxidation state of palladium is 0.

In some embodiments, the concentration of tetrakis(triphenylphosphine)palladium(0) in the metal precursor solution is in a range from 0.0001M to 0.010 M, preferably 0.0005M to 0.003M, preferably 0.00075M to 0.0025M, preferably 0.001M to 0.002M. In a preferred embodiment, concentration of tetrakis(triphenylphosphine)palladium(0) in the metal precursor is 0.002 M. In another preferred embodiment, concentration of tetrakis(triphenylphosphine) palladium(0) in the metal precursor is 0.001M.

In some embodiments, the base may include, but is not limited to, lithium tert-butoxide, sodium tert-butoxide, potassium tert-butoxide, cesium tert-butoxide, rubidium tert-butoxide, magnesium tert-butoxide, calcium tert-butoxide, strontium tert-butoxide, barium tert-butoxide, lithium isopropoxide, sodium isopropoxide, potassium isopropoxide, lithium ethoxide, sodium ethoxide, potassium ethoxide, lithium methoxide, sodium methoxide, potassium methoxide, lithium neopentoxide, sodium neopentoxide, potassium neopentoxide, lithium tert-pentoxide, sodium tert-pentoxide, potassium tert-pentoxide, sodium hexamethyldisilazide (NaHMDS), and potassium hexamethyldisilazide (KHMDS). In a preferred embodiment, the base is sodium tert-butoxide. In some embodiments, the concentration of sodium tert-butoxide in the metal precursor solution is in a range from 0.1 to 2 M, preferably 0.3 to 1.8 M, preferably 0.5 to 1.6 M, preferably 0.7 to 1.4 M, preferably 0.8 to 1.2 M, preferably 0.9 to 1.1 M. In a preferred embodiment, concentration of sodium tert-butoxide in the metal precursor solution is 1.0 M.

In some embodiments, the additives used may include, but are not limited to, dimethyl acetamide, tetrahydrofuran (THF), CH₃COONa (sodium acetate), PhCl (chlorobenzene), AlCl₃ (aluminum chloride), BArF [B(C₆F₅)₃], TIBA (triisobutylaluminum), Zn (zinc), MMAO-12 (methylaluminoxane), DIBALH (diisobutylaluminum hydride), and a combination of Zn, CH₃COONa, and THF. In some embodiments, additives may also include, but are not limited to, sodium acetate, sodium propionate, sodium benzoate, sodium citrate, sodium lactate, potassium formate, ammonium formate, lithium formate, sodium oxalate, sodium succinate, sodium phthalate, sodium ascorbate, sodium gluconate, sodium bicarbonate, potassium acetate, sodium methanesulfonate, sodium trifluoroacetate, sodium maleate, sodium tartrate, sodium malonate, ammonium acetate, sodium malate, sodium butyrate, sodium glutamate, sodium carbonate, sodium sulfate, magnesium sulfate, calcium formate, lithium acetate, sodium thiocyanate, and sodium salicylate. In a preferred embodiment, the additive is sodium formate. In some embodiments, the additive concentration in the metal precursor solution is in a range from 0.4 to 2 M, preferably 0.8 to 1.6 M, preferably 0.9 to 1.5 M, preferably 1 to 1.4 M, preferably 1.1 to 1.3 M. In a preferred embodiment, the additive concentration of the metal precursor solution is 1.2 M.

In some embodiments, solvents may include, but are not limited to dimethyl sulfoxide (DMSO), dimethylformamide (DMF), tetrahydrofuran (THF), acetonitrile, methanol, ethanol, isopropanol, toluene, benzene, chloroform, dichloromethane (DCM), ethyl acetate, diethyl ether, 1,4-dioxane, cyclohexane, heptane, hexane, acetone, methyl tert-butyl ether (MTBE), N-methyl-2-pyrrolidone (NMP), pyridine, water, n-butanol, 2-butanone (MEK), isobutanol, propylene carbonate, dimethoxyethane (DME), diglyme, trichloroethylene, carbon tetrachloride, tetrahydrofuran (THF), chlorobenzene (PhCl), dimethylacetamide (DMA), cyclohexylphosphine (CHP), anisole, and combinations thereof. In some embodiments, the solvent is selected from N-cyclohexyl-2-pyrrolidone, tetrahydrofuran, and combinations thereof. In a preferred embodiment, solvent is N-cyclohexyl-2-pyrrolidone.

In some embodiments, the ligand may include, but is not limited to, 1,2-bis(diphenylphosphino)ethane (dppe), 1,2-bis(dicyclohexylphosphino)ethane (dcpe), 1,2-bis(dicyclohexylphosphino)methane (dcpm), 1,4-bis(dicyclohexylphosphino)butane (dcpb), 1,3-bis(dicyclohexylphosphino)propane (dcpp), 1,2-bis(dimethylphosphino)ethane (dmpe), 1,1'-bis(diphenylphosphino)ferrocene (dppf), 1,2-bis(diphenylphosphino)benzene (dppbz), bis(diphenylphosphino)methane (dppm), 1,2-bis(diisopropylphosphino)ethane (dippe), 1,2-bis(di-tert-butylphosphino)ethane (dtbpe), and bis[(2-di-tert-butylphosphino)ethyl]amine (PNP). In some embodiments, ligands may include, but are not limited to triphenylphosphine, 1,10-phenanthroline, 2,2'-bipyridine, tetraphenylporphyrin, ethylenediamine, diethylenetriamine, tris(2-aminoethyl)amine, tri-n-butylphosphine, tricyclohexylphosphine, 1,2-bis(diphenylphosphino)ethane (dppe), 1,1'-bis(diphenylphosphino)ferrocene (dppf), N-heterocyclic carbenes (NHCs), 2,2'-biquinoline, tetradentate amines, salen ligands, schiff bases, tetradentate phosphines, tris(pyrazolyl) borates, terpyridine, cyclam, porphyrins, phthalocyanines, diimine ligands, acetylacetonate (acac), crown ethers, cryptands, oxalate, cyanide, carbonyl, thiolates, and pyridylphosphines. In a preferred embodiment, the ligand is 1,2-bis(dicyclohexylphosphino)ethane.

In some embodiments, the metal precursor-to-ligand-to-base molar ratio may vary depending on the reaction conditions, substrate concentration, and catalyst loading. In some embodiments, the molar ratio of metal precursor to bidentate ligand is generally maintained close to 1:1.1 to achieve desirable coordination and catalyst stability. The base is typically used in large excess relative to the metal catalyst to facilitate the desired transformation efficiently.

In some embodiments, the metal precursor to ligand molar ratio in the metal precursor solution is in the range of 1:6 to 6:1, preferably 1:5 to 5:1, preferably 1:4 to 4:1, preferably 1:3 to 3:1, preferably 1:2 to 2:1, preferably 1:1.1. In some embodiments, the metal precursor to base molar ratio in the metal precursor solution is in the range of 1:10 to 1:3000, preferably 1:100 to 1:2000, preferably, 1:200 to 1:1500, preferably 1:500 to 1:1250, preferably 1:1000. In some embodiments, the ligand to the base molar ratio in the metal precursor solution is in the range of 1:10 to 1:3000, preferably 1:100 to 1:2000, preferably, 1:200 to 1:1500, preferably 1:500 to 1:1250, preferably 1:909.

In some embodiments, the metal-to-ligand-to-base molar ratio may vary in a range from 1:1.1:50, 1:1.1:100, 1:1.1:250, 1:1.1:500, 1:1.1:750, and 1:1.1:1000, 1:1.1:3000. In a preferred embodiment, the metal-to-ligand-to-base ratio is 1:1.1:250. In another a preferred embodiment, the metal-to-ligand-to-base ratio is 1:1.1:1000.

At step 54, the method 50 reacting, in the autoclave, $CO_2$ with the metal complex intermediate solution at a reaction temperature to form an ester intermediate solution. In some embodiments, the reaction temperature is in a range from 75 to 250° C., preferably 100 to 200° C., preferably 140 to 190° C., preferably 175 to 185° C. In a preferred embodiment, the reaction temperature is 180° C.

In some embodiments, the $CO_2$ is reacted with the metal complex intermediate solution at pressure ranging from 1 to 200 bar, preferably 5 to 100 bar, preferably 10 to 90 bar, preferably 20 to 80 bar, preferably 20 to 70 bar, preferably 25 to 60 bar, preferably 30 to 50 bar. In a preferred embodiment, $CO_2$ is reacted with the metal complex intermediate solution at pressure of 40 bar.

At step 56, the method 50 includes reacting the ester intermediate solution at the reaction temperature to form an acrylate salt product mixture.

In some embodiments, the reaction temperature is maintained for 4 to 30 hours, preferably 7 to 28 hours, preferably 10 to 26 hours, preferably 14 to 25 hours, preferably 18 to 24 hours. In a preferred embodiment, the reaction temperature is maintained for 20 hours.

At step 58, the method 50 includes extracting an acrylate salt from the acrylate salt product mixture with water. In some embodiments, extraction may be done by methanol, ethanol, isopropanol, n-butanol, acetone, acetonitrile, hexane, heptane, diethyl ether, ethyl acetate, chloroform, dichloromethane, toluene, benzene, carbon tetrachloride, cyclohexane, tetrahydrofuran (THF), dimethylformamide (DMF), dimethyl sulfoxide (DMSO), 1,4-dioxane, propylene glycol, glycerol, petroleum ether, methyl tert-butyl ether (MTBE), 2-butanone (MEK), n-pentane, isooctane, formic acid, trifluoroacetic acid, and naphtha. In a preferred embodiment, the acrylate salt is extracted from the acrylate salt product mixture with water.

The turnover number is defined as the moles of acrylate salt formed per mole of catalyst. In some embodiments, the turnover number is greater than or equal to 50, preferably greater than or equal to 100, preferably greater than or equal to 150, preferably greater than or equal to 200, preferably greater than or equal to 250, more preferably greater than or equal to 300, preferably greater than or equal to 350, and even more preferably greater than or equal to 390.

In a preferred embodiment, when the concentration of the metal precursor, preferably tetrakis(triphenylphosphine)palladium(0), in the metal precursor is 0.002 M, the concentration of sodium tert-butoxide is 1 M, and the concentration of sodium formate is 1.2 M, the turnover number is 342. In another preferred embodiment, when the concentration of the metal precursor, preferably tetrakis(triphenylphosphine) palladium(0), is 0.001 M, the concentration of sodium tert-butoxide is 1 M sodium tert-butoxide, and the concentration of sodium formate is 1.2 M, then the turnover number is 398.

The following examples are provided solely for illustration and are not to be construed as limitations of the present disclosure, as many variations thereof are possible without departing from the spirit and scope of the present disclosure.

EXAMPLES

The following examples demonstrate a method of acrylate salt production using a metal precursor, carbon dioxide ($CO_2$), and an additive. The examples are provided solely for illustration and are not to be construed as limitations of the present disclosure, as many variations thereof are possible without departing from the spirit and scope of the present disclosure.

Example 1: Materials

Figure 1B:
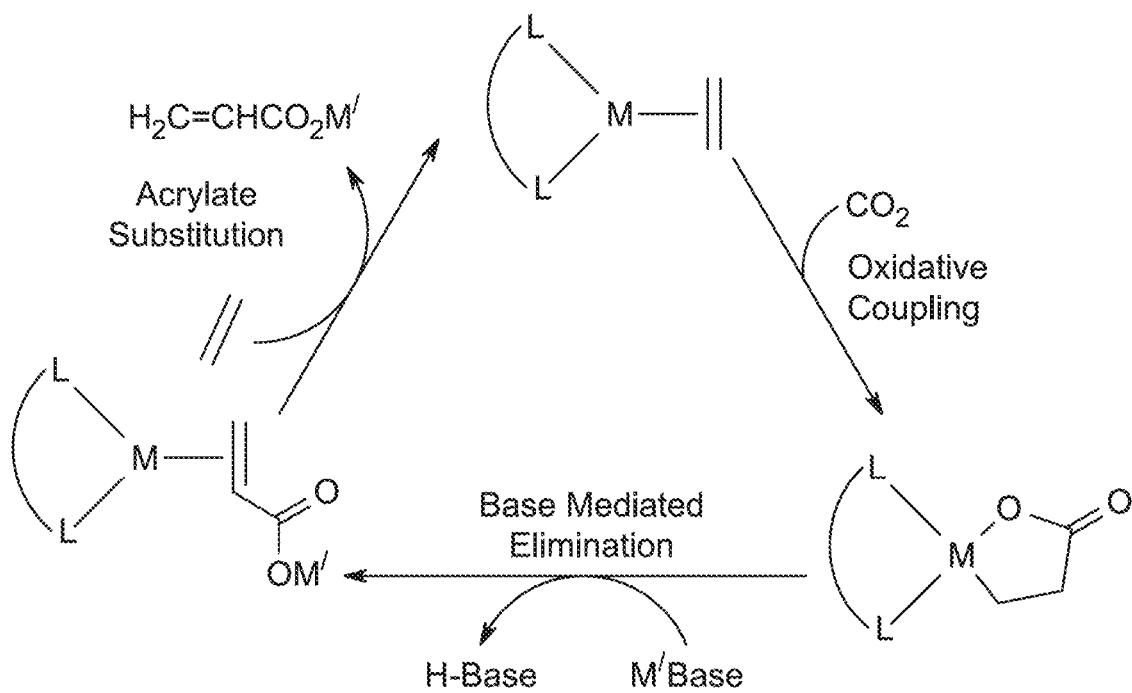
FIG. 1B is an exemplary scheme for a proposed reaction mechanism involving base assisted synthesis of acrylate salt ($H_2C=CHCOOM$) from $CO_2$ and ethylene, according to certain embodiments.
Figure 1C:
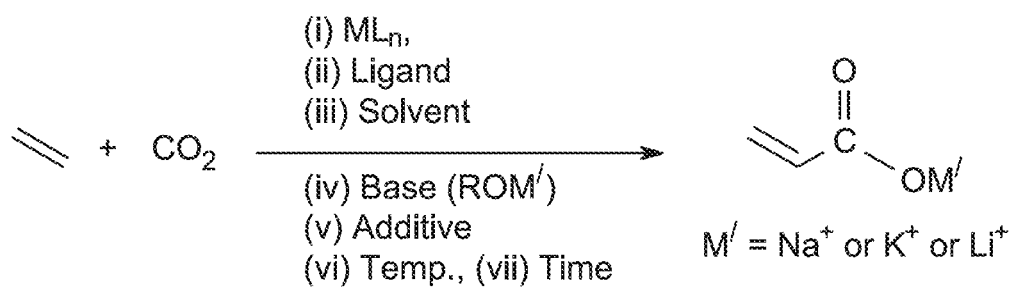
FIG. 1C is an exemplary reaction scheme for catalytic carboxylation of ethylene to produce acrylate salt, according to certain embodiments.

According to the present disclosure, all air and moisture sensitive operations were performed using standard Schlenk techniques and a MBraun glove box operating under argon-atmosphere. Solvents, such as N-cyclohexyl-2-pyrrolidone (CHP), tetrahydrofuran (THF), anisole and chlorobenzene were dried over molecular sieve (4 Å) 3 times, degassed by argon and stored over fresh active molecular sieves (4 Å) inside the glove box. All other reagents were obtained from Sigma-Aldrich and used as received. Specialty gases, such as Ar (99.999%), $C_2H_4$ (99.995%) and $CO_2$ (99.995%) were procured from AHG and Air Liquide gas supplies. A stainless-steel autoclave fitted with glass liner (30 mL capacity) and equipped with an overhead stirrer from a Parr 4848 reactor was used to perform carboxylation reactions of ethylene. A second stainless steel autoclave fitted with a glass liner (60 mL) was also used to perform the same reaction. All the reactants including metal precursor, ligand, base, additives, and solvent were charged into the autoclave inside the glove box operating under Ar atmosphere. The preliminary information regarding the formation of the products was examined by a bench top 60 MHz NMR spectrometer (Magritek Spinsolve) followed by quantitative analysis using a Bruker 400 MHz or 600 MHz spectrometer. The samples were prepared in $D_2O$ where 3-(Trimethylsilyl) propionic-2,2,3,3-d4 acid sodium salt (($CH_3$)$_3$Si$CD_2CD_2CO_2$Na) was used as an internal standard (IS). In addition, a proposed reaction mechanism involving base assisted synthesis of acrylate salt ($H_2$C=CHCOOM) from $CO_2$ and ethylene is provided in FIG. 1B. The reaction scheme for catalytic carboxylation of ethylene to produce acrylate salt is provided in FIG. 1C.

Example 2: Procedure for the Catalytic Acrylate Salt Formation from $CO_2$ and Ethylene The catalytic reactions were performed in a magnetically stirred 60 mL glass lined stainless steel autoclave. In the aforesaid procedure, a stoichiometric amount of metal precursor such as Pd(PPh$_3$)$_4$ and the bisphosphine ligand were dissolved in a desirable amount of solvent (5 mL) followed by addition of base inside the glove box. In-situ reducing reagent such as Zn powder and/or the additives including, but not limited to, HCOONa, $CH_3$COONa, $CH_3$COOK, triisobutylaluminium (TIBA) were added where necessary, as shown in Table 1. After closing and taking out from the glove box, the autoclave was placed over a magnetic stirrer. Under vigorous stirring, ethylene gas at a pressure of about 10 bar was introduced into the reactor and the reaction was allowed to continue for 10 minutes at room temperature followed by introduction of $CO_2$ gas at 30 bar, and stirred for an additional 10 minutes. Further, the autoclave was isolated and heated to the desired temperature using a heating jacket equipped with a thermocouple and temperature controller. After the completion of a predetermined reaction time, the autoclave was cooled down quickly inside an ice bath. The pressure of the reactor was released slowly. Furthermore, about 3 mL to 4 mL $D_2O$ and a solution 0.5 mL of internal standard (($CH_3$)$_3$Si$CD_2CD_2CO_2$Na) (22 mg/mL of $D_2O$) were added to the full reaction mixture inside the glass liner, sequentially, under magnetic stirring. After the addition of about 35 mL of diethyl ether, the reaction mixture was stirred for 5 minutes. The $D_2O$ layer was collected and filtered using a 0.45 micrometer (μm) syringe filter. The acrylate product was analyzed by protonated nuclear magnetic resonance ($^1$H NMR) spectroscopy, as provided in FIGS. 2-8. The turnover number (TON) of the reaction was determined using the equation as specified below:

$$TON = \frac{\text{moles of acrylate salt formed}}{\text{moles of metal complex used}} \quad (1)$$

Figure 2:
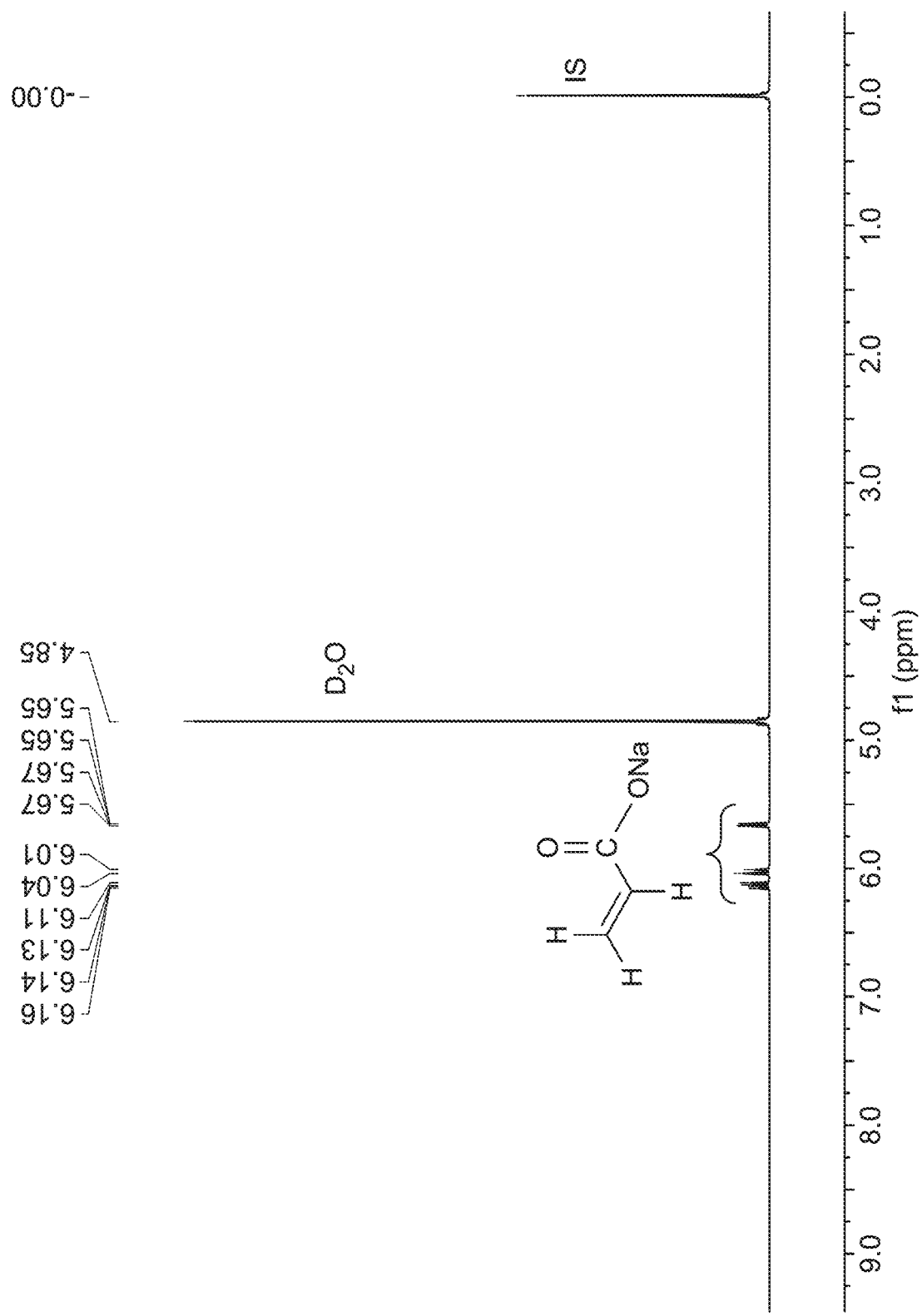
FIG. 2 is a standard proton nuclear magnetic resonance ($^1H$ NMR) spectra of a reference sample including sodium acrylate and an internal standard, recorded in $D_2O$ solvent at 400 megahertz (MHz), according to certain embodiments.
Figure 3:
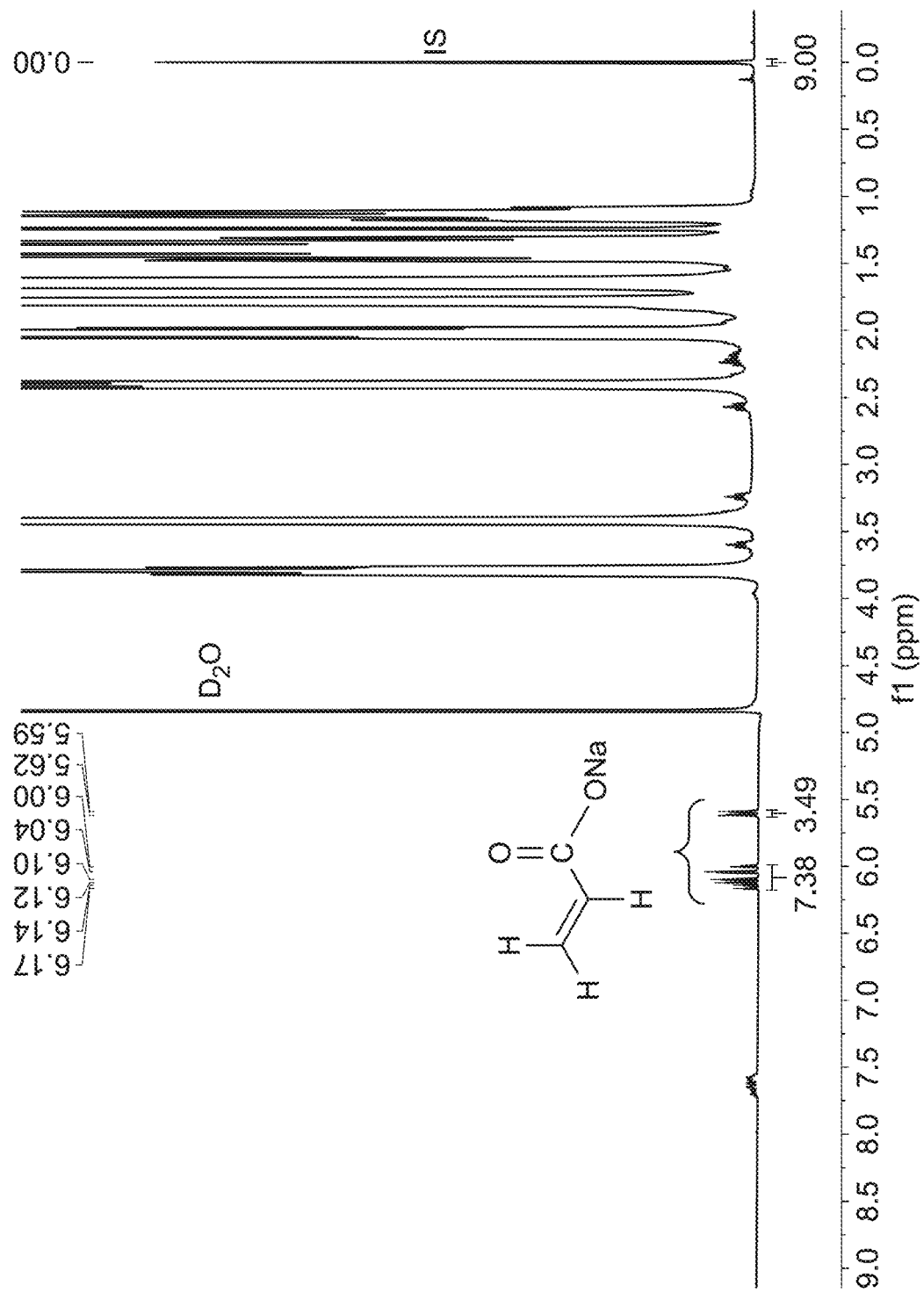
FIG. 3 is a $^1H$ NMR spectra of a reaction mixture containing an acrylate salt product and an internal standard, recorded in $D_2O$ solvent at 600 MHz under catalytic conditions corresponding to a baseline reaction without an additive, according to certain embodiments.
Figure 4:
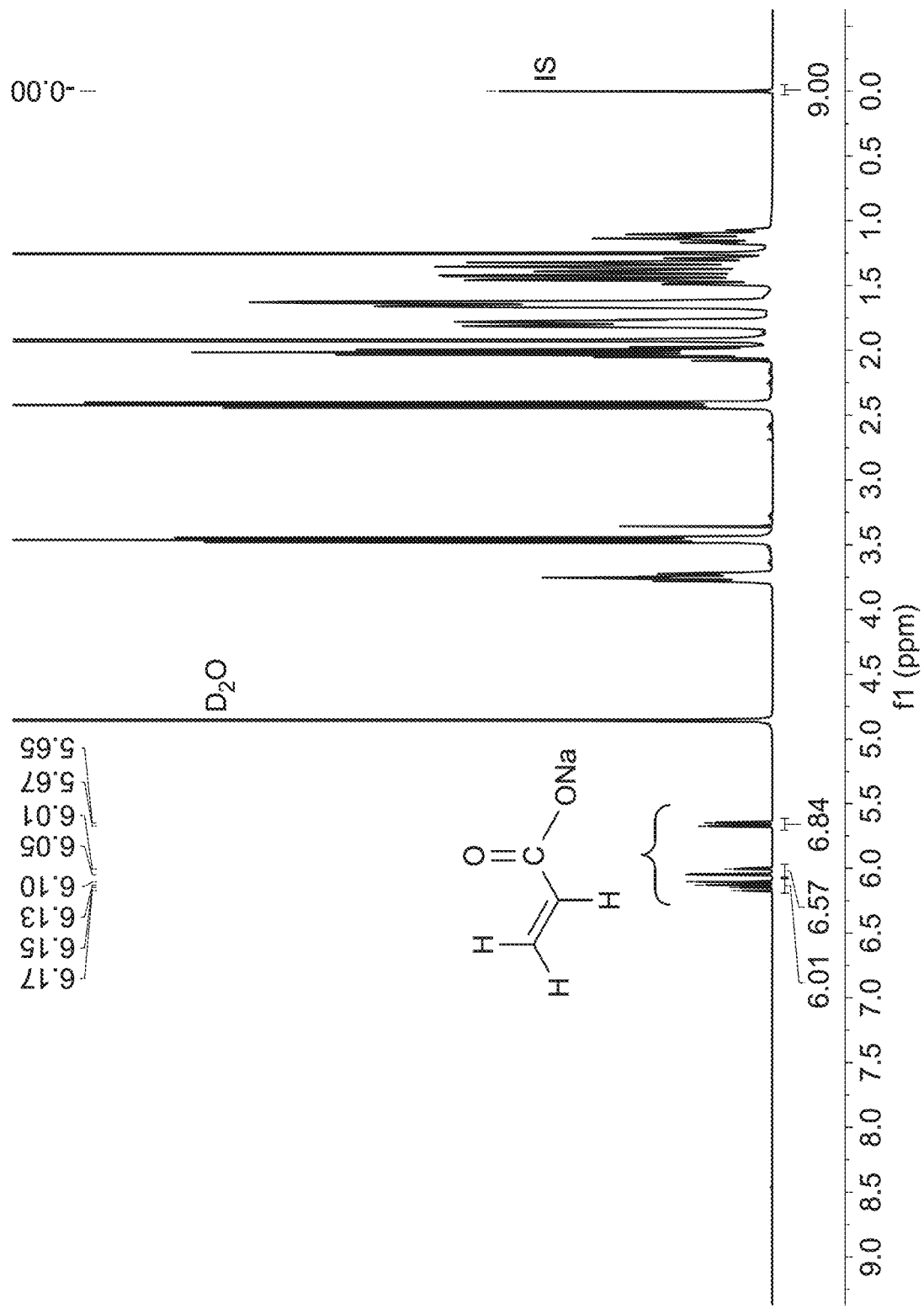
FIG. 4 is a $^1H$ NMR spectra of the reaction mixture containing the acrylate salt product and the internal standard, recorded in $D_2O$ solvent at 600 MHz under catalytic conditions including sodium acetate as an additive, according to certain embodiments.
Figure 5:
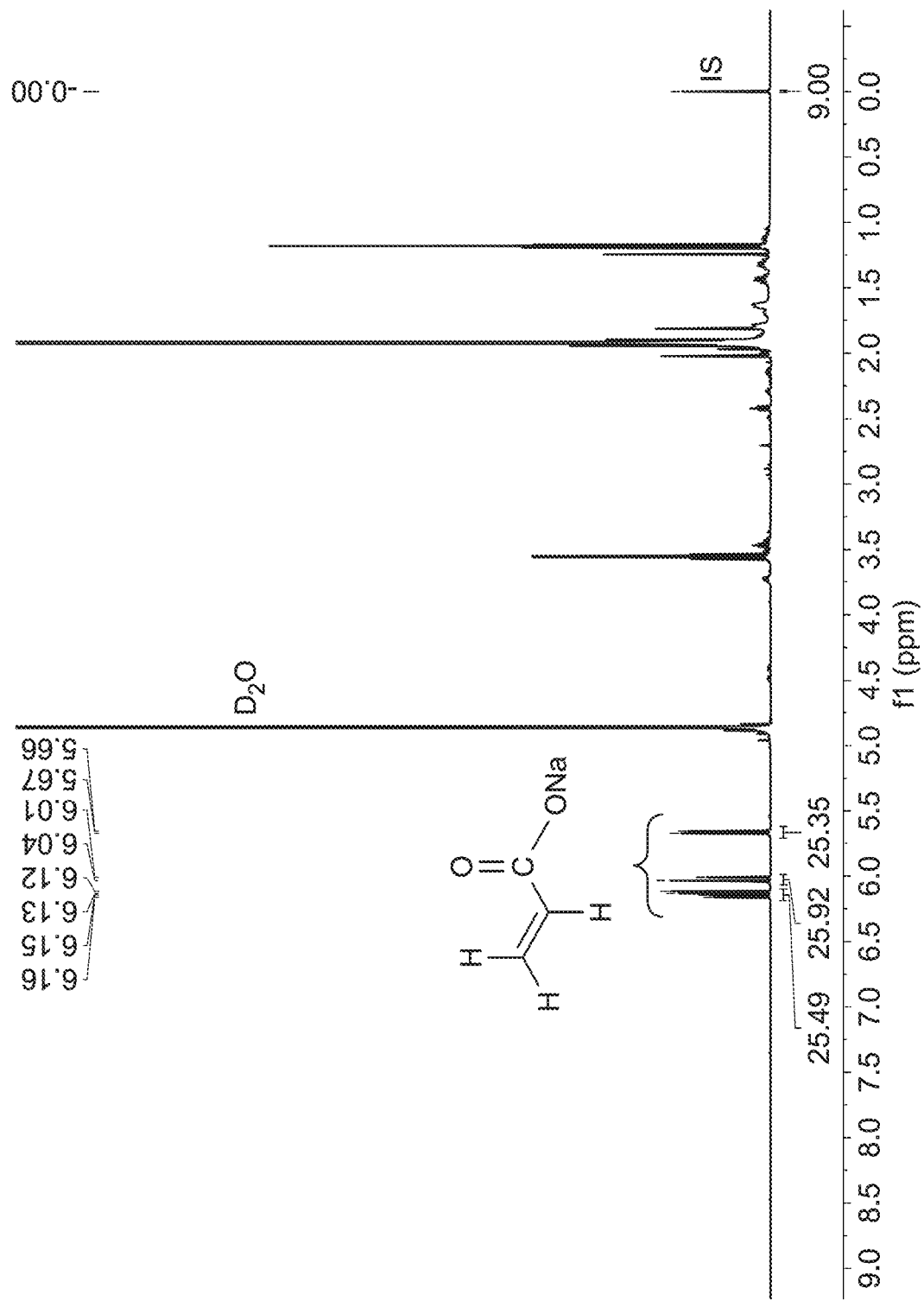
FIG. 5 is a $^1H$ NMR spectra of the reaction mixture containing the acrylate salt product and the internal standard, recorded in $D_2O$ solvent at 600 MHz under catalytic conditions including potassium acetate as the additive, according to certain embodiments.
Figure 6:
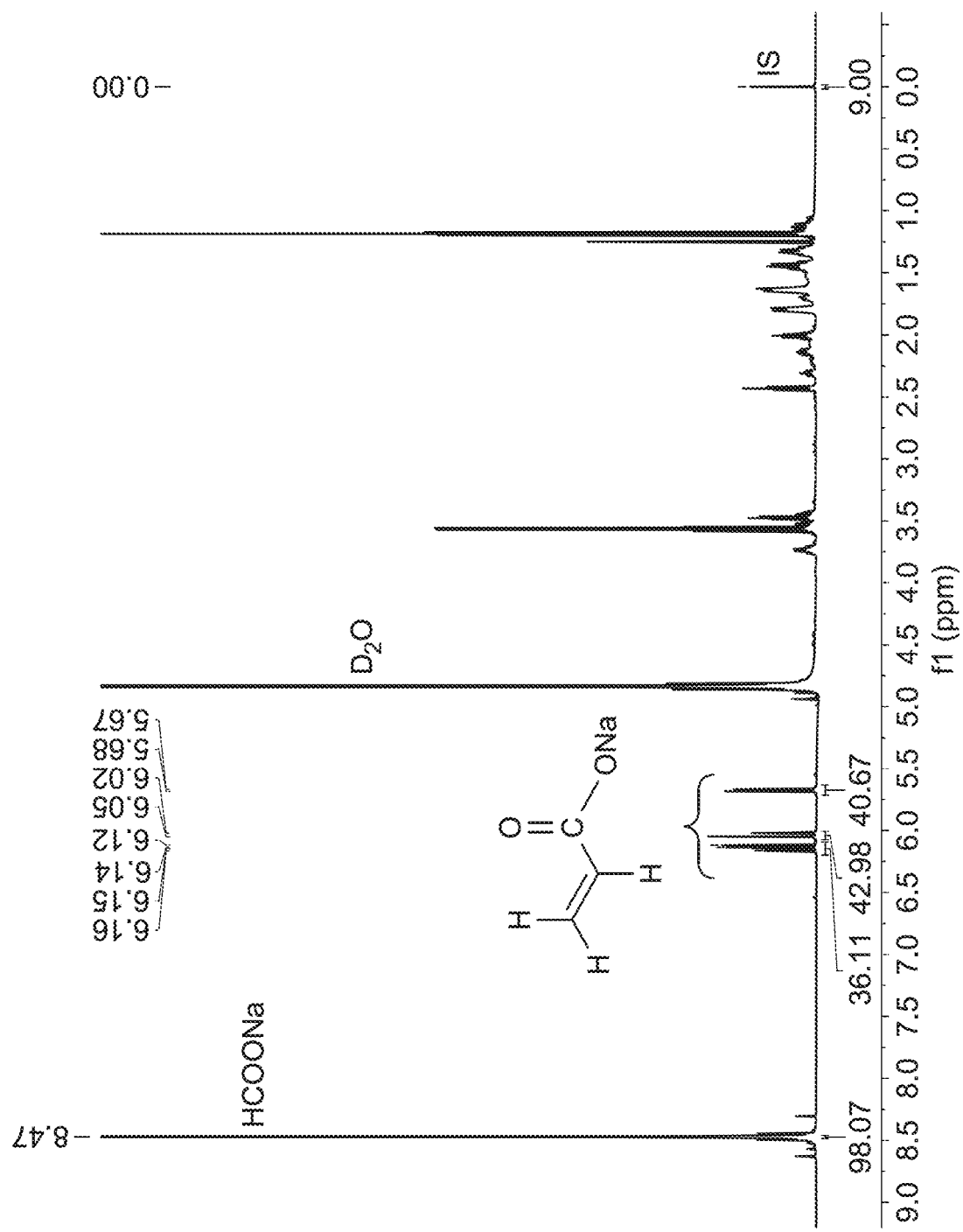
FIG. 6 is a $^1H$ NMR spectra of the reaction mixture containing the acrylate salt product and the internal standard, recorded in $D_2O$ solvent at 600 MHz under catalytic conditions including sodium formate as the additive, according to certain embodiments.
Figure 7:
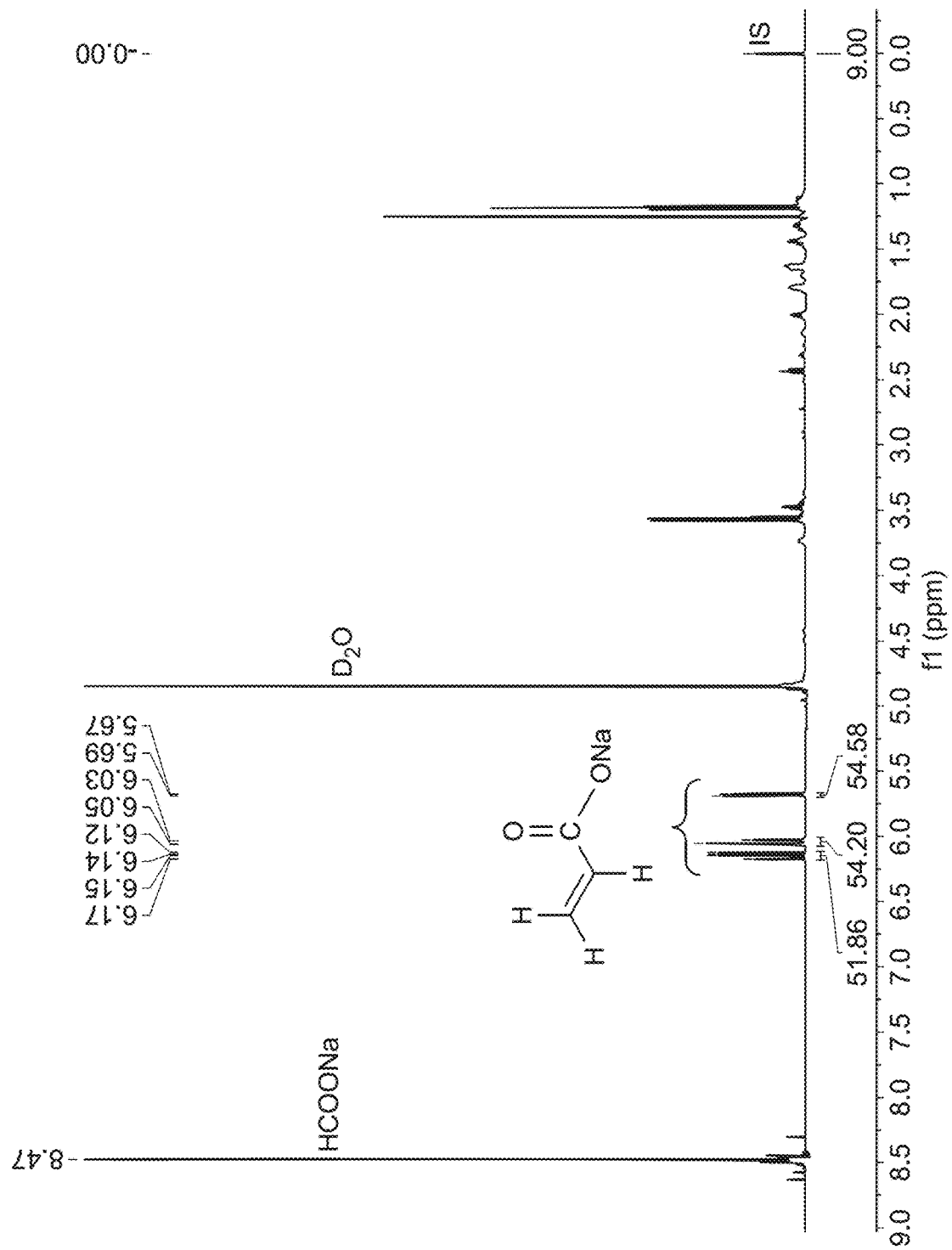
FIG. 7 is a $^1H$ NMR spectra of the reaction mixture containing the acrylate salt product and the internal standard, recorded in $D_2O$ solvent at 600 MHz under catalytic conditions including sodium formate as the additive and an increased base concentration according to certain embodiments.
Figure 8:
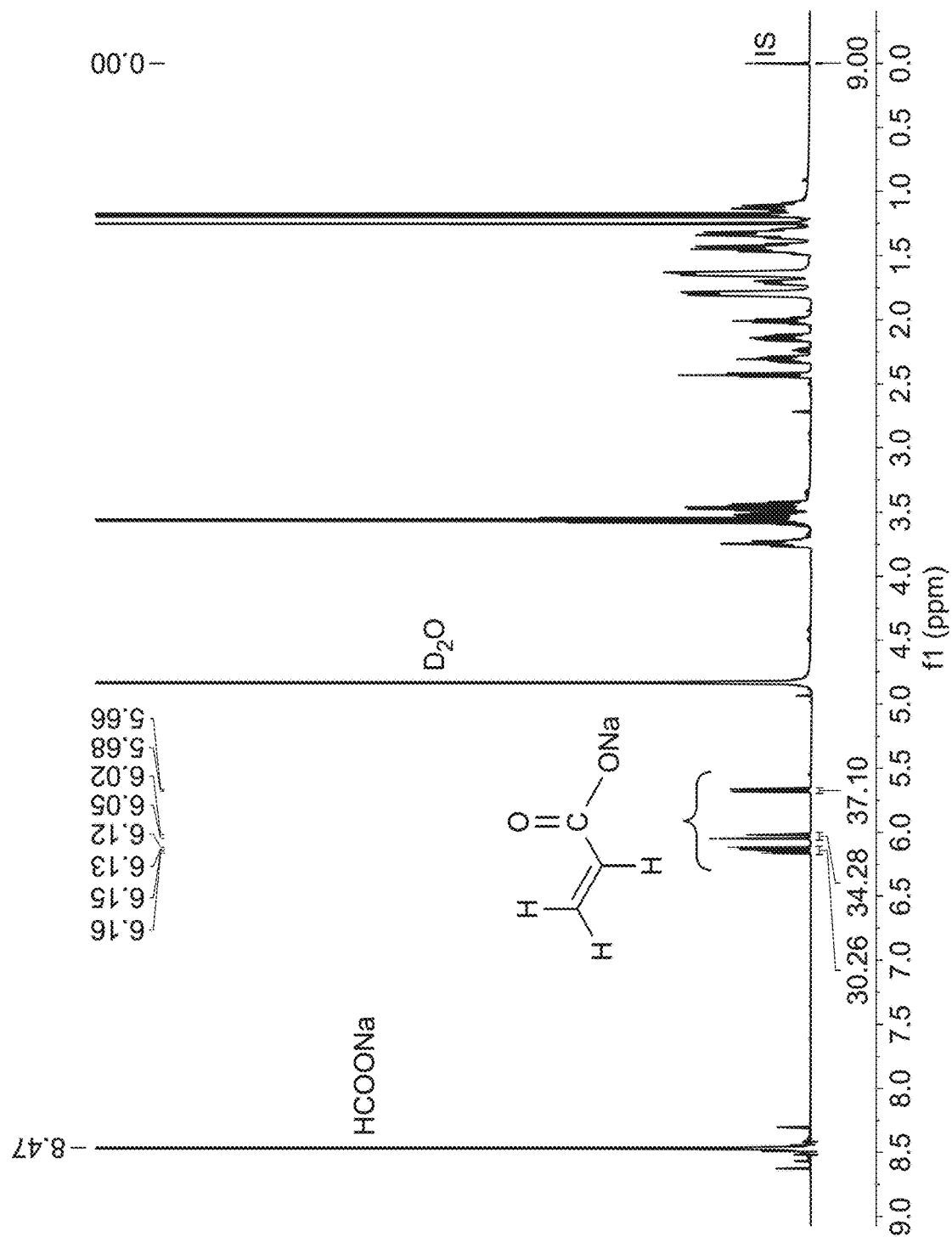
FIG. 8 is a $^1H$ NMR spectra of the reaction mixture containing the acrylate salt product and an internal standard, recorded in $D_2O$ solvent at 600 MHz under catalytic conditions comprising sodium formate as the additive and an increased metal to base ratio, according to certain embodiments.

The NMR spectrum of the mixture of reference compounds is provided in FIG. 2 (Sodium acrylate. $^1$H NMR (400 MHZ, $D_2O$): δ=5.66 (dd, J=9.4, 2.7 Hz, 1H), 6.16-6.00 (m, 2H). 3-(trimethylsilyl) propionic-2,2,3,3-d4 acid sodium salt. $^1$H NMR (400 MHZ, $D_2O$): δ=0.00 ppm ($CH_3$)$_3$).

TABLE 1

Catalytic carboxylation of ethylene to produce acrylate salt

| No. | Metal precursor | Ligand | Base | Solvent (mL) | Additive | $C_2H_4$ (bar) | $C_2H_4$ + $CO_2$ (bar) | Time (h) | Temp. (° C.) | TON |
|---|---|---|---|---|---|---|---|---|---|---|
| 1 | [Pd(PPh$_3$)$_4$] (0.01 mmol) | Ph$_2$P⌒PPh$_2$ (dppe) (0.011 mmol) | KOtBu (10 mmol) | THF (20 mL) | — | 15 | 40 | 22 | 100 | 0 |

TABLE 1-continued

Catalytic carboxylation of ethylene to produce acrylate salt

| No. | Metal precursor | Ligand | Base | Solvent (mL) | Additive | C$_2$H$_4$ (bar) | C$_2$H$_4$ + CO$_2$ (bar) | Time (h) | Temp. (° C.) | TON |
|---|---|---|---|---|---|---|---|---|---|---|
| 2 | [Pd(PPh$_3$)$_4$] (0.01 mmol) | 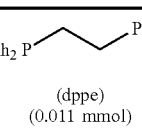 (dppe) (0.011 mmol) | KOtBu (10 mmol) | THF (20 mL) | — | 17 | 45 | 22 | 100 | 0 |
| 3 | [Pd(PPh$_3$)$_4$] (0.01 mmol) | 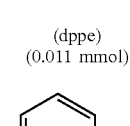 (dppe) (0.011 mmol) | KOtBu (10 mmol) | THF (20 mL) | — | 17 | 45 | 22 | 145 | 0 |
| 4 | [Pd(PPh$_3$)$_4$] (0.01 mmol) | 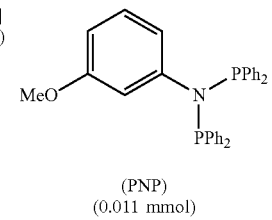 (PNP) (0.011 mmol) | KOtBu (10 mmol) | THF (20 mL) | — | 17 | 45 | 22 | 100 | 0 |
| 5 | [Pd(PPh$_3$)$_4$] (0.1 mmol) | 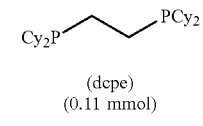 (dcpe) (0.11 mmol) | KOtBu (5 mmol) | THF (20 mL) | — | 15 | 55 | 20 | 100 | 0 |
| 6 | [Pd(PPh$_3$)$_4$] (0.01 mmol) | 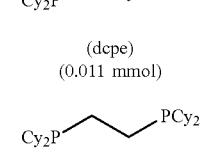 (dcpe) (0.011 mmol) | KOtBu (5 mmol) | THF (10 mL) | — | 15 | 55 | 20 | 100 | 0 |
| 7 | [Pd(PPh$_3$)$_4$] (0.1 mmol) |  (dcpe) (0.11 mmol) | NaOtBu (5 mmol) | CHP (20 mL) 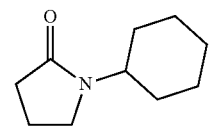 [SMILES: O=C1CCCN1C1CCCCC1] | — | 10 | 40 | ~6 | 100 | 13 |
| 8 | [Pd(PPh$_3$)$_4$] (0.025 mmol) | 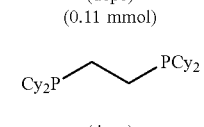 (dcpe) (0.0275 mmol) | NaOtBu (2.5 mmol) | THF (5 mL) | — | 10 | 40 | 20 | 100 | 8 |
| 9 | [Pd(PPh$_3$)$_4$] (0.025 mmol) | 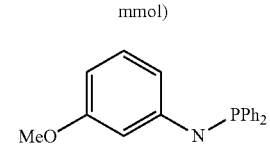 (PNP) (0.0275 mmol) | KOtBu (2.5 mmol) | THF (5 mL) | — | 10 | 40 | 20 | 100 | 0 |
| 10 | [Pd(PPh$_3$)$_4$] (0.025 mmol) | 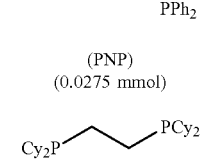 (dcpe) (0.0275 mmol) | NaOtBu (2.5 mmol) | THF (5 mL) | — | 10 | 40 | 4 | 100 | 2 |

TABLE 1-continued

Catalytic carboxylation of ethylene to produce acrylate salt

| No. | Metal precursor | Ligand | Base | Solvent (mL) | Additive | C₂H₄ (bar) | C₂H₄ + CO₂ (bar) | Time (h) | Temp. (° C.) | TON |
|---|---|---|---|---|---|---|---|---|---|---|
| 11 | [Ni(COD)₂] (0.025 mmol) | 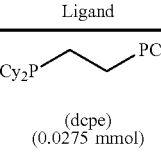 (dcpe) (0.0275 mmol) | NaOtBu (2.5 mmol) | THF (5 mL) | — | 10 | 40 | 20 | 100 | 2.4 |
| 12 | [Pd(PPh₃)₄] (0.025 mmol) | 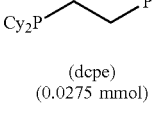 (dcpe) (0.0275 mmol) | NaOtBu (2.5 mmol) | PhCl (5 mL) | 0.1 mL of dimethyl acetamide | 10 | 40 | 20 | 100 | 1.6 |
| 13 | [Pd(PPh₃)₄] (0.025 mmol) | 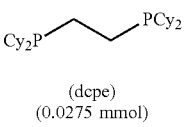 (dcpe) (0.0275 mmol) | NaOtBu (2.5 mmol) | DMA (5 mL) | — | 10 | 40 | 20 | 100 | 12 |
| 14 | [Pd(PPh₃)₄] (0.01 mmol) | 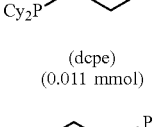 (dcpe) (0.011 mmol) | KOtBu (25 mmol) | 11 mL CHP | THF (7 mL) | 10 | 40 | 20 | 145 | 1.9 |
| 15 | [Pd(PPh₃)₄] (0.01 mmol) | 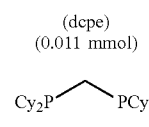 (dcpe) (0.011 mmol) | NaOtBu (2.5 mmol) | CHP (5 mL) | — | 10 | 40 | 20 | 145 | 61 |
| 16 | [Pd(PPh₃)₄] (0.01 mmol) | 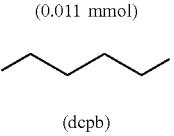 (dcpm) (0.011 mmol) | NaOtBu (2.5 mmol) | CHP (5 mL) | — | 10 | 40 | 20 | 145 | 3 |
| 17 | [Pd(PPh₃)₄] (0.01 mmol) | 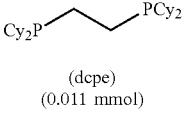 (dcpb) (0.011 mmol) | NaOtBu (2.5 mmol) | CHP (5 mL) | — | 10 | 40 | 20 | 145 | 2 |
| 18 | [Pd(PPh₃)₄] (0.01 mmol) | 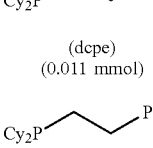 (dcpe) (0.011 mmol) | NaOtBu (2.5 mmol) | CHP (5 mL) | Zn (2 mmol) | 10 | 40 | 20 | 145 | 98 |
| 19 | [Pd(PPh₃)₄] (0.01 mmol) | 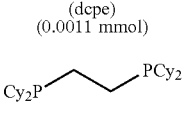 (dcpe) (0.011 mmol) | NaOtBu (2.5 mmol) | CHP (5 mL) | THF (0.5 mL) | 10 | 40 | 20 | 145 | 114 |
| 20 | [Pd(PPh₃)₄] (0.001 mmol) |  (dcpe) (0.0011 mmol) | NaOtBu (2.5 mmol) | CHP (5 mL) | THF (0.5 mL) | 10 | 40 | 20 | 145 | ~0 |
| 21 | [Pd(PPh₃)₄] (0.001 mmol) | (dcpe) (0.0011 mmol) | NaOtBu (2.5 mmol) | CHP (2 mL) | — | 10 | 40 | 20 | 145 | 10 |

TABLE 1-continued

Catalytic carboxylation of ethylene to produce acrylate salt

| No. | Metal precursor | Ligand | Base | Solvent (mL) | Additive | C₂H₄ (bar) | C₂H₄ + CO₂ (bar) | Time (h) | Temp. (° C.) | TON |
|---|---|---|---|---|---|---|---|---|---|---|
| 22 | [Pd(PPh₃)₄] (0.01 mmol) | 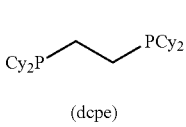 (dcpe) (0.011 mmol) | NaOtBu (2.5 mmol) | CHP (5 mL) | CH₃COONa (6 mmol) | 10 | 40 | 20 | 145 | 84 |
| 23 | [Pd(PPh₃)₄] (0.01 mmol) | 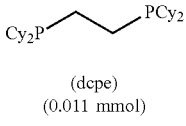 (dcpe) (0.011 mmol) | NaOtBu (2.5 mmol) | CHP (2 mL) | PhCl (3 mL) | 10 | 40 | 20 | 145 | 6.8 |
| 24 | [Pd(PPh₃)₄] (0.01 mmol) | 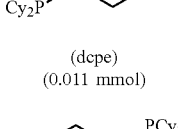 (dcpe) (0.011 mmol) | NaOtBu (2.5 mmol) | CHP (5 mL) | AlCl₃ (0.1 mmol) | 10 | 40 | 20 | 145 | 84 |
| 25 | [Pd(PPh₃)₄] (0.01 mmol) | 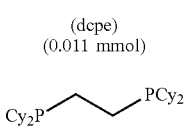 (dcpe) (0.011 mmol) | NaOtBu (2.5 mmol) | CHP (5 mL) | BAr$^F$ (0.1 mmol) [BAr$^F$ = B(C₆F₅)₃] | 10 | 40 | 20 | 145 | 76 |
| 26 | [Pd(PPh₃)₄] (0.01 mmol) | 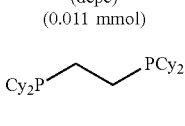 (dcpe) (0.011 mmol) | NaOtBu (2.5 mmol) | CHP (5 mL) | TIBA (0.1 mmol) (TIBA = Triisobutyl aluminiu) | 10 | 40 | 20 | 145 | 154 |
| 27 | [Pd(PPh₃)₄] (0.01 mmol) | 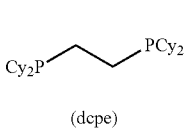 (dcpe) (0.011 mmol) | NaOtBu (2.5 mmol) | CHP (5 mL) | Zn (2 mmol) + CH₃COONa (6 mmol) + THF (0.5 mL) | 10 | 40 | 20 | 145 | 64 |
| 28 | [Pd(PPh₃)₄] (0.01 mmol) | 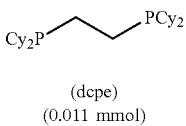 (dcpe) (0.011 mmol) | KHMDS (KSi₂C₆NH₈) (2.5 mmol) | CHP (5 mL) | — | 10 | 40 | 20 | 145 | 0 |
| 29 | [Pd(PPh₃)₄] (0.01 mmol) | 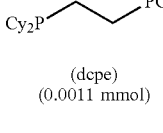 (dcpe) (0.011 mmol) | NaOtBu (2.5 mmol) | CHP (5 mL) | — | 10 | 50 | 20 | 145 | 27 |
| 30 | [Pd(PPh₃)₄] (0.001 mmol) | 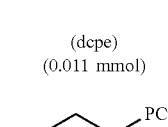 (dcpe) (0.0011 mmol) | NaOtBu (2.5 mmol) | CHP (5 mL) | — | 10 | 50 | 20 | 145 | 0 |
| 31 | [Pd(PPh₃)₄] (0.01 mmol) | 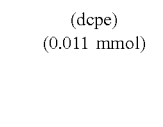 (dcpe) (0.011 mmol) | NaOtBu (25 mmol) | CHP(10 mL) | — | 10 | 50 | 20 | 145 | 0 |
| 32 | [Pd(PPh₃)₄] (0.01 mmol) |  (dcpe) (0.011 mmol) | NaOtBu (25 mmol) | CHP (30 mL) | — | 10 | 40 | 20 | 145 | 0 |

TABLE 1-continued

Catalytic carboxylation of ethylene to produce acrylate salt

| No. | Metal precursor | Ligand | Base | Solvent (mL) | Additive | C$_2$H$_4$ (bar) | C$_2$H$_4$ + CO$_2$ (bar) | Time (h) | Temp. (° C.) | TON |
|---|---|---|---|---|---|---|---|---|---|---|
| 33 | [Pd(PPh$_3$)$_4$] (0.01 mmol) | Cy$_2$P–PCy$_2$ (dcpe) (0.011 mmol) | NaOtBu (25 mmol) | THF (30 mL) | — | 10 | 50 | 20 | 145 | 0 |
| 34 | [Pd(PPh$_3$)$_4$] (0.01 mmol) | Cy$_2$P–PCy$_2$ (dcpe) (0.011 mmol) | NaOtBu (25 mmol) | CHP (30 mL) | — | 10 | 50 | 20 | 145 | 0 |
| 35 | [Pd(PPh$_3$)$_4$] (0.01 mmol) | Cy$_2$P–PCy$_2$ (dcpe) (0.011 mmol) | NaOtBu (12.5 mmol) | CHP (10 mL) | — | 10 | 50 | 20 | 145 | 11 |
| 36 | [Pd(PPh$_3$)$_4$] (0.01 mmol) | Cy$_2$P–PCy$_2$ (dcpe) (0.011 mmol) | NaOtBu (2.5 mmol) | Anisole (5 mL) | — | 10 | 40 | 20 | 145 | 14 |
| 37 | [Pd(PPh$_3$)$_4$] (0.01 mmol) | Cy$_2$P–PCy$_2$ (dcpe) (0.011 mmol) | NaOtBu (25 mmol) | Anisole (30 mL) | — | 10 | 50 | 20 | 145 | 7 |
| 38 | [Pd(PPh$_3$)$_4$] (0.01 mmol) | Cy$_2$P–PCy$_2$ (dcpp) (0.011 mmol) | NaOtBu (2.5 mmol) | CHP (5 mL) | — | 10 | 40 | 20 | 145 | 11 |
| 39 | [Pd(PPh$_3$)$_4$] (0.01 mmol) | Me$_2$P–PMe$_2$ (dmpe) (0.011 mmol) | NaOtBu (2.5 mmol) | CHP (5 mL) | — | 10 | 40 | 20 | 145 | 7 |
| 40 | [Pd(PPh$_3$)$_4$] (0.01 mmol) | Cy$_2$P–PCy$_2$ (dcpe) (0.011 mmol) | NaOtBu (2.5 mmol) | CHP (5 mL) | AlEt$_3$ (0.1 mmol) | 10 | 40 | 20 | 145 | 78 |
| 41 | [Pd(PPh$_3$)$_4$] (0.01 mmol) | Cy$_2$P–PCy$_2$ (dcpe) (0.011 mmol) | NaOtBu (2.5 mmol) | CHP (5 mL) | MMAO-12 (Methylaluminoxane) (0.1 mmol) | 10 | 40 | 20 | 145 | 53 |
| 42 | [Pd(PPh$_3$)$_4$] (0.01 mmol) | Cy$_2$P–PCy$_2$ (dcpe) (0.011 mmol) | NaOtBu (2.5 mmol) | CHP (5 mL) | DIBALH (Diisobutyl aluminium hydride) (0.1 mmol) | 10 | 40 | 20 | 145 | 47 |
| 43 | [Pd(PPh$_3$)$_4$] (0.01 mmol) | Cy$_2$P–PCy$_2$ (dcpe) (0.011 mmol) | NaOtBu (2.5 mmol) | CHP (5 mL) | — | 10 | 40 | 20 | 180 | 70 |

TABLE 1-continued

Catalytic carboxylation of ethylene to produce acrylate salt

| No. | Metal precursor | Ligand | Base | Solvent (mL) | Additive | C₂H₄ (bar) | C₂H₄ + CO₂ (bar) | Time (h) | Temp. (° C.) | TON |
|---|---|---|---|---|---|---|---|---|---|---|
| 44 | [Pd(PPh₃)₄] (0.01 mmol) | Cy₂P⌒PCy₂ (dcpe) (0.011 mmol) | NaOtBu (2.5 mmol) | CHP (5 mL) | — | 10 | 40 | 20 | 200 | 29 |
| 45 | [Pd(PPh₃)₄] (0.01 mmol) | Cy₂P⌒PCy₂ (dcpe) (0.011 mmol) | NaOtBu (2.5 mmol) | CHP (5 mL) | — | 10 | 20 | 20 | 180 | 51 |
| 46 | [Pd(PPh₃)₄] (0.01 mmol) | Cy₂P⌒PCy₂ (dcpe) (0.011 mmol) | NaOtBu (2.5 mmol) | CHP (5 mL) | — | 15 | 30 | 20 | 180 | 26 |
| 47 | [Pd(PPh₃)₄] (0.01 mmol) | Cy₂P⌒PCy₂ (dcpe) (0.011 mmol) | NaOtBu (2.5 mmol) | CHP (5 mL) | — | 20 | 40 | 20 | 180 | 53 |
| 48 | [Pd(PPh₃)₄] (0.01 mmol) | Cy₂P⌒PCy₂ (dcpe) (0.011 mmol) | NaOtBu (2.5 mmol) | CHP (5 mL) | TIBA (0.1 mmol) | 10 | 40 | 20 | 180 | 29 |
| 49 | [Pd(PPh₃)₄] (0.01 mmol) | Cy₂P⌒PCy₂ (dcpe) (0.011 mmol) | NaOtBu (2.5 mmol) | CHP (5 mL) | TIBA (0.1 mmol) | 10 | 40 | 20 | 180 | 38 |
| 50 | [Pd(PPh₃)₄] (0.01 mmol) | Cy₂P⌒PCy₂ (dcpe) (0.011 mmol) | NaOtBu (2.5 mmol) | CHP (5 mL) | Zn (2.0 mmol) | 10 | 40 | 20 | 180 | 30 |
| 51 | [Pd(PPh₃)₄] (0.01 mmol) | Cy₂P⌒PCy₂ (dcpe) (0.011 mmol) | NaOtBu (2.5 mmol) | CHP (5 mL) | Zn (2.0 mmol) + TIBA (0.1 mmol) | 10 | 40 | 20 | 145 | 11 |
| 52 | [Pd(PPh₃)₄] (0.01 mmol) | Cy₂P⌒PCy₂ (dcpe) (0.011 mmol) | NaOtBu (2.5 mmol) | CHP (5 mL) | Zn (2.0 mmol) + TIBA (0.1 mmol) | 10 | 40 | 20 | 180 | 33 |
| 53 | [Pd(PPh₃)₄] (0.01 mmol) | Cy₂P⌒PCy₂ (dcpe) (0.011 mmol) | NaOtBu (2.5 mmol) | CHP (5 mL) | CH3COONa (6.0 mmol) | 10 | 40 | 20 | 180 | 136 |
| 54 | [Pd(PPh₃)₄] (0.01 mmol) | Cy₂P⌒PCy₂ (dcpe) (0.011 mmol) | NaOtBu (2.5 mmol) | NMP (5 mL) 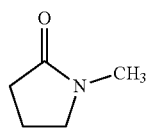 | CH3COONa (6.0 mmol) | 10 | 40 | 20 | 180 | 34 |

TABLE 1-continued

Catalytic carboxylation of ethylene to produce acrylate salt

| No. | Metal precursor | Ligand | Base | Solvent (mL) | Additive | C$_2$H$_4$ (bar) | C$_2$H$_4$ + CO$_2$ (bar) | Time (h) | Temp. (° C.) | TON |
|---|---|---|---|---|---|---|---|---|---|---|
| 55 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) Non-dried | CH3COONa (6.0 mmol) | 10 | 40 | 20 | 180 | 110 |
| 56 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) Non-dried | Zn (2.0 mmol) + CH3COONa (6.0 mmol) | 10 | 40 | 20 | 180 | 83 |
| 57 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | Zn (2.0 mmol) + CH3COONa (6.0 mmol) | 10 | 40 | 20 | 180 | 107 |
| 58 | [Pd(PPh$_3$)$_4$] (0.01 mmol) | Cy$_2$P⌒PCy$_2$ (dcpe) (0.011 mmol) | PhONa (2.5 mmol) | CHP (5 mL) | CH3COONa (6.0 mmol) | 10 | 40 | 20 | 180 | 0 |
| 59 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | CH3COONa (6.0 mmol) | 10 | 40 | 20 | 180 | 50 |
| 60 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | TIBA (0.1 mmol) | 10 | 40 | 20 | 120 | 2 |
| 61 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | Zn(CH3COO)2·2H2O (6 mmol) | 10 | 40 | 20 | 180 | 0 |
| 62 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | Hg(CH3COO)2 (6 mmol) | 10 | 40 | 20 | 180 | 0 |
| 63 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | TTB ((C6F5)3B-C + (C6H5)3) (6 mmol) | 10 | 40 | 20 | 180 | 28 |
| 64 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | TIBA (0.1 mmol) | 10 | 40 | 4 | 145 | 12 |
| 65 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | — | 10 | 40 | 20 | 180 | 64 |
| 66 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | NaI (6 mmol) | 10 | 40 | 20 | 180 | 0 |

TABLE 1-continued

Catalytic carboxylation of ethylene to produce acrylate salt

| No. | Metal precursor | Ligand | Base | Solvent (mL) | Additive | C$_2$H$_4$ (bar) | C$_2$H$_4$ + CO$_2$ (bar) | Time (h) | Temp. (° C.) | TON |
|---|---|---|---|---|---|---|---|---|---|---|
| 67 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | — | 10 | 40 | 40 | 180 | 16 |
| 68 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | CaH2 (6 mmol) | 10 | 40 | 20 | 180 | 102 |
| 69 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | NaH (6 mmol) | 10 | 40 | 20 | 180 | 30 |
| 70 | [Pd(PPh$_3$)$_4$] (0.01 mmol) | Cy$_2$P⌒PCy$_2$ (dcpe) (0.011 mmol) | NaOtBu (25 mmol) | CHP (30 mL) | — | 10 | 40 | 20 | 145 | 0 |
| 71 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | — | 10 | 40 | 20 | 180 | 70 |
| 72 | [Pd(PPh$_3$)$_4$] (0.01 mmol) | Cy$_2$P⌒PCy$_2$ (dcpe) (0.011 mmol) | NaOtBu (25 mmol) | CHP (30 mL) | — | 10 | 40 | 20 | 145 | 20 |
| 73 | [Pd(PPh$_3$)$_4$] (0.02 mmol) | Cy$_2$P⌒PCy$_2$ (dcpe) (0.022 mmol) | NaOtBu (25 mmol) | CHP (30 mL) | — | 10 | 40 | 20 | 145 | 65 |
| 74 | [Pd(PPh$_3$)$_4$] (0.01 mmol) | Cy$_2$P⌒PCy$_2$ (dcpe) (0.011 mmol) | NaOtBu (25 mmol) | CHP (30 mL) | — | 10 | 50 | 20 | 145 | 0 |
| 75 | [Pd(PPh$_3$)$_4$] (0.01 mmol) | Cy$_2$P⌒PCy$_2$ (dcpe) (0.011 mmol) | NaOtBu (25 mmol) | CHP (30 mL) | — | 10 | 50 | 20 | 180 | 0 |
| 76 | [Pd(PPh$_3$)$_4$] (0.01 mmol) | Cy$_2$P⌒PCy$_2$ (dcpe) (0.011 mmol) | NaOtBu (25 mmol) | CHP (40 mL) | — | 10 | 50 | 20 | 180 | 0 |
| 77 | [Pd(PPh$_3$)$_4$] (0.02 mmol) | Cy$_2$P⌒PCy$_2$ (dcpe) (0.022 mmol) | NaOtBu (25 mmol) | CHP (30 mL) | — | 10 | 40 | 20 | 180 | 77 |

TABLE 1-continued

Catalytic carboxylation of ethylene to produce acrylate salt

| No. | Metal precursor | Ligand | Base | Solvent (mL) | Additive | $C_2H_4$ (bar) | $C_2H_4 + CO_2$ (bar) | Time (h) | Temp. (° C.) | TON |
|---|---|---|---|---|---|---|---|---|---|---|
| 78 | [Pd(PPh$_3$)$_4$] (0.01 mmol) | Cy$_2$P⌒PCy$_2$ (dcpe) (0.011 mmol) | NaOtBu (25 mmol) | CHP (40 mL) | — | 10 | 50 | 20 | 180 | 21 |
| 79 | [Pd(PPh$_3$)$_4$] (0.01 mmol) | Cy$_2$P⌒PCy$_2$ (dcpe) (0.011 mmol) | NaOtBu (25 mmol) | CHP (60 mL) | — | 10 | 30 | 20 | 180 | 51 |
| 80 | [Pd(PPh$_3$)$_4$] (0.02 mmol) | Cy$_2$P⌒PCy$_2$ (dcpe) (0.022 mmol) | NaOtBu (12.5 mmol) | CHP (30 mL) | — | 10 | 30 | 20 | 180 | 105 |
| 81 | [Pd(PPh$_3$)$_4$] (0.02 mmol) | Cy$_2$P⌒PCy$_2$ (dcpe) (0.022 mmol) | NaOtBu (25 mmol) | CHP (30 mL) | — | 10 | 30 | 20 | 180 | 22 |
| 82 | [Pd(PPh$_3$)$_4$] (0.01 mmol) | Cy$_2$P⌒PCy$_2$ (dcpe) (0.011 mmol) | NaOtBu (25 mmol) | CHP (30 mL) | — | 10 | 30 | 20 | 180 | 33 |
| 83 | [Pd(PPh$_3$)$_4$] (0.02 mmol) | Cy$_2$P⌒PCy$_2$ (dcpe) (0.022 mmol) | NaOtBu (12.5 mmol) | CHP (30 mL) | — | 10 | 20 | 20 | 180 | 42 |
| 84 | [Pd(PPh$_3$)$_4$] (0.02 mmol) | Cy$_2$P⌒PCy$_2$ (dcpe) (0.022 mmol) | NaOtBu (12.5 mmol) | CHP (30 mL) | — | 10 | 30 | 20 | 180 | 79 |
| 85 | [Pd(PPh$_3$)$_4$] (0.02 mmol) | Cy$_2$P⌒PCy$_2$ (dcpe) (0.022 mmol) | NaOtBu (12.5 mmol) | CHP (30 mL) | CH3COONa (6.0 mmol) | 10 | 40 | 20 | 180 | 0 |
| 86 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | HCOONa (6.0 mmol) | 10 | 40 | 20 | 180 | 247 |
| 87 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | CF3COONa (6.0 mmol) | 10 | 40 | 20 | 180 | 23 |
| 88 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | PhCOONa (6.0 mmol) | 10 | 40 | 20 | 180 | 87 |
| 89 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | CH3COOK (6.0 mmol) | 10 | 40 | 20 | 180 | 163 |

TABLE 1-continued

Catalytic carboxylation of ethylene to produce acrylate salt

| No. | Metal precursor | Ligand | Base | Solvent (mL) | Additive | $C_2H_4$ (bar) | $C_2H_4 +$ $CO_2$ (bar) | Time (h) | Temp. (° C.) | TON |
|---|---|---|---|---|---|---|---|---|---|---|
| 90 | [Pd(PPh$_3$)$_4$] (0.01 mmol) | Cy$_2$P⌒PCy$_2$ (dcpe) (0.011 mmol) | NaOtBu (5 mmol) | CHP (5 mL) | HCOONa (6.0 mmol) | 10 | 40 | 20 | 180 | 342 |
| 91 | [Pd(PPh$_3$)$_4$] (0.01 mmol) | Cy$_2$P⌒PCy$_2$ (dcpe) (0.011 mmol) | NaOtBu (10 mmol) | CHP (5 mL) | HCOONa (6.0 mmol) | 10 | 40 | 20 | 180 | 47 |
| 92 | [Pd(PPh$_3$)$_4$] (0.005 mmol) | Cy$_2$P⌒PCy$_2$ (dcpe) (0.0055 mmol) | NaOtBu (5 mmol) | CHP (5 mL) | HCOONa (6.0 mmol) | 10 | 40 | 20 | 180 | 258 |
| 93 | [Pd(PPh$_3$)$_4$] (0.005 mmol) | Cy$_2$P⌒PCy$_2$ (dcpe) (0.0055 mmol) | NaOtBu (7.5 mmol) | CHP (5 mL) | HCOONa (6.0 mmol) | 10 | 40 | 20 | 180 | 58 |
| 94 | [Pd(PPh$_3$)$_4$] (0.01 mmol) | Cy$_2$P⌒PCy$_2$ (dcpe) (0.011 mmol) | KOtBu (5 mmol) | CHP (5 mL) | HCOONa (6.0 mmol) | 10 | 40 | 20 | 180 | 109 |
| 95 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | CH3COOLi (6.0 mmol) | 10 | 40 | 20 | 180 | 19 |
| 96 | [Pd(PPh$_3$)$_4$] (0.01 mmol) | Cy$_2$P⌒PCy$_2$ (dcpe) (0.011 mmol) | NaOtBu (2.5 mmol) | CHP (5 mL) | (CH3COO)2Ca (6.0 mmol) | 10 | 40 | 20 | 180 | 1 |
| 97 | [Pd(PPh$_3$)$_4$] (0.01 mmol) | Cy$_2$P⌒PCy$_2$ (dcpe) (0.011 mmol) | LiOtBu (2.5 mmol) | CHP (5 mL) | — | 10 | 40 | 20 | 180 | 0 |
| 98 | [Pd(PPh$_3$)$_4$] (0.01 mmol) | Cy$_2$P⌒PCy$_2$ (dcpe) (0.011 mmol) | LiOtBu (2.5 mmol) | CHP (5 mL) | HCOONa (6.0 mmol) | 10 | 40 | 20 | 180 | 0 |
| 99 | [Pd(PPh$_3$)$_4$] (0.01 mmol) | Cy$_2$P⌒PCy$_2$ (dcpe) (0.011 mmol) | LiOtBu (2.5 mmol) | CHP (5 mL) | CH3COONa (6.0 mmol) | 10 | 40 | 20 | 180 | 0 |
| 100 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | HCOONa (6.0 mmol) | 10 | 40 | 20 | 180 | 11 |
| 101 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | CH3COONa (6.0 mmol) | 10 | 40 | 20 | 180 | 33 |

TABLE 1-continued

Catalytic carboxylation of ethylene to produce acrylate salt

| No. | Metal precursor | Ligand | Base | Solvent (mL) | Additive | $C_2H_4$ (bar) | $C_2H_4 + CO_2$ (bar) | Time (h) | Temp. (° C.) | TON |
|---|---|---|---|---|---|---|---|---|---|---|
| 102 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | CH3COOK (6.0 mmol) | 10 | 40 | 20 | 180 | 31 |
| 103 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | CH3COOLi (6.0 mmol) | 10 | 40 | 20 | 180 | 5 |
| 104 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | CF3COONa (6.0 mmol) | 10 | 40 | 20 | 180 | 16 |
| 105 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | (CH3COO)2Ca (6.0 mmol) | 10 | 40 | 20 | 180 | 1 |
| 106 | [Pd(PPh$_3$)$_4$] (0.01 mmol) | Cy$_2$P⌒PCy$_2$ (dcpe) (0.011 mmol) | KOtBu (2.5 mmol) | CHP (5 mL) | PhCOONa (6.0 mmol) | 10 | 40 | 20 | 180 | 24 |
| 107 | [Pd(PPh$_3$)$_4$] (0.01 mmol) | Cy$_2$P⌒PCy$_2$ (dcpe) (0.011 mmol) | KOtBu (2.5 mmol) | CHP (5 mL) + TIBA (8 μL) | HCOONa (6.0 mmol) | 10 | 40 | 20 | 180 | 73 |
| 108 | [Pd(PPh$_3$)$_4$] (0.01 mmol) | Cy$_2$P⌒PCy$_2$ (dcpe) (0.011 mmol) | KOtBu (2.5 mmol) | CHP (5 mL) + TIBA (8 μL) | — | 10 | 40 | 20 | 180 | 199 |
| 109 | [Pd(PPh$_3$)$_4$] (0.01 mmol) | Cy$_2$P⌒PCy$_2$ (dcpe) (0.011 mmol) | NaOtBu (5 mmol) | CHP (5 mL) + TIBA (8 μL) | HCOONa (6.0 mmol) | 10 | 40 | 20 | 180 | 232 |
| 110 | [Pd(PPh$_3$)$_4$] (0.005 mmol) | Cy$_2$P⌒PCy$_2$ (dcpe) (0.0055 mmol) | NaOtBu (5 mmol) | CHP (5 mL) + TIBA (8 μL) | HCOONa (6.0 mmol) | 10 | 40 | 20 | 180 | 398 |

The catalyst system as described herein, was developed for the carboxylation of ethylene including commercially a available palladium precursor, phosphine ligands, bases, solvents and additives as shown in Table 1. The present disclosure describes a combination of Pd(PPh$_3$)$_4$, dcpe ligand, and NaOtBu base in CHP solvent, as shown in Table 2. The data collected for the reaction conducted at 180° C. is detailed in Table 2, indicating a TON of 70 after 20 hours. Subsequently, a series of additives were assessed under identical reaction conditions, including PhCOONa, CH$_3$COONa, CH$_3$COOK and HCOONa, as shown in Table 2.

Row 2 in Table 2 demonstrates that employing an excess of sodium benzoate (PhCOONa) as an additive resulted in an improved TON to 88. The aforementioned improvement was further elevated to a TON of 136 by replacing sodium benzoate with sodium acetate (CH$_3$COONa) as an additive, as shown in row 3 of Table 2. The utilization of potassium acetate (CH$_3$COOK) as an additive further enhanced the TON to 163, as shown in row 4 of Table 2. Moreover, the introduction of sodium formate (HCOONa) as an additive increased the TON to 247, as shown in row 5 of Table 2.

The catalytic performance was subsequently heightened, reaching a TON of 398, by increasing the base stoichiometry concerning the palladium loading while keeping other reaction parameters constant, as shown in row 6 and 7 of Table 2. The aforementioned results demonstrate the role played by additives in facilitating the reaction mechanism, ultimately leading to the production of the highly desirable acrylate product.

TABLE 2

Representative catalytic results on carboxylation of ethylene to produce acrylate salt

| Entry No. | Metal precursor | Ligand | Base | Additive | TON |
|---|---|---|---|---|---|
| 1 | [Pd(PPh$_3$)$_4$] (0.01 mmol) | Cy$_2$P⌒PCy$_2$ (dcpe) (0.011 mmol) | NaOtBu (2.5 mmol) | — | 70 |
| 2 | [Pd(PPh$_3$)$_4$] (0.01 mmol) | Cy$_2$P⌒PCy$_2$ (dcpe) (0.011 mmol) | NaOtBu (2.5 mmol) | PhCOONa (6 mmol) | 88 |
| 3 | [Pd(PPh$_3$)$_4$] (0.01 mmol) | Cy$_2$P⌒PCy$_2$ (dcpe) (0.011 mmol) | NaOtBu (2.5 mmol) | CH$_3$COONa (6 mmol) | 136 |
| 4 | [Pd(PPh$_3$)$_4$] (0.01 mmol) | Cy$_2$P⌒PCy$_2$ (dcpe) (0.011 mmol) | NaOtBu (2.5 mmol) | CH$_3$COOK (6 mmol) | 163 |
| 5 | [Pd(PPh$_3$)$_4$] (0.01 mmol) | Cy$_2$P⌒PCy$_2$ (dcpe) (0.011 mmol) | NaOtBu (2.5 mmol) | HCOONa (6 mmol) | 247 |
| 6 | [Pd(PPh$_3$)$_4$] (0.01 mmol) | Cy$_2$P⌒PCy$_2$ (dcpe) (0.011 mmol) | NaOtBu (5 mmol) | HCOONa (6 mmol) | 342 |
| 7 | [Pd(PPh$_3$)$_4$] (0.005 mmol) | Cy$_2$P⌒PCy$_2$ (dcpe) (0.0055 mmol) | NaOtBu (5 mmol) | HCOONa (6.0 mmol) | 398 |

The aspects of the present disclosure are directed towards the development and optimization of a catalytic process for acrylate salt production through $CO_2$ insertion into olefins. A series of additive evaluations including sodium benzoate, sodium acetate, and potassium acetate as additives demonstrated variable improvements in catalytic performance. Among these, sodium formate exhibited a substantial enhancement in reactivity, achieving a TON of 247. Further modifications involving the adjustment of base concentration relative to the palladium precursor resulted in a TON up to 398. The foregoing results demonstrate the sensitivity of the catalytic system to reaction parameters and emphasize the influence of additive identity and stoichiometric tuning. The systematic investigation presented herein establishes a foundational reference for further mechanistic studies and process refinement in additive-assisted catalytic transformations involving carbon dioxide and olefins.

Numerous modifications and variations of the present disclosure are possible in light of the above teachings. It is therefore to be understood that within the scope of the appended claims, the disclosure may be practiced otherwise than as specifically described herein.

The invention claimed is:

1. A method of acrylate salt production, comprising:
reacting, in an autoclave, ethylene gas in the presence of a metal precursor solution comprising a base, an additive, a metal precursor, a solvent and a ligand to form a metal complex intermediate solution;
reacting, in the autoclave, $CO_2$ with the metal complex intermediate solution at a reaction temperature to form an ester intermediate solution;
reacting the ester intermediate solution at a reaction temperature to form an acrylate salt product mixture;
extracting an acrylate salt from the acrylate salt product mixture with water,
wherein the reaction temperature is in a range from 100 to 200° C.,
wherein the metal precursor is tetrakis(triphenylphosphine)palladium(0) and the concentration of tetrakis(triphenylphosphine)palladium(0) in the metal precursor solution is in a range from 0.0005M to 0.003M,
wherein the additive is sodium formate,
wherein the solvent is selected from the group consisting of N-cyclohexyl-2-pyrrolidone, tetrahydrofuran, and combinations thereof, and
wherein a turnover number is greater than or equal to 100, wherein the turnover number is defined as the moles of acrylate salt formed per mole of catalyst.

2. The method of claim 1, wherein the base is sodium tert-butoxide and the sodium tert-butoxide concentration of the metal precursor solution is in a range from 0.3 to 1.4 M.

3. The method of claim 2, wherein the sodium tert-butoxide concentration of the metal precursor solution is in a range from 0.6 to 1.2 M.

4. The method of claim 3, wherein the sodium tert-butoxide concentration of the metal precursor solution is 1 M.

5. The method of claim 1, wherein the additive concentration of the metal precursor solution is in a range from 0.8 to 1.6 M.

6. The method of claim 5, wherein the additive concentration of the metal precursor solution is in a range from 1 to 1.4 M.

7. The method of claim 6, wherein the additive concentration of the metal precursor solution is 1.2 M.

8. The method of claim 1, wherein the concentration of tetrakis(triphenylphosphine)palladium(0) in the metal precursor solution is in a range from 0.00075M to 0.0025M.

9. The method of claim 8, wherein the concentration of tetrakis(triphenylphosphine)palladium(0) in the metal precursor solution is in a range from 0.001M to 0.002M.

10. The method of claim 1, wherein the reaction temperature is in a range from 140 to 190° C.

11. The method of claim 10, wherein the reaction temperature is in a range from 175 to 185° C.

12. The method of claim 1, wherein the reaction temperature is maintained for 4 to 30 hours.

13. The method of claim 12, wherein the reaction temperature is maintained for 18 to 24 hours.

14. The method of claim 13, wherein reaction temperature is maintained for 20 hours.

15. The method of claim 1, wherein the solvent is N-cyclohexyl-2-pyrrolidone.

16. The method of claim 1, wherein the turnover number is greater than or equal to 200.

17. The method of claim 1, wherein the turnover number is greater than or equal to 300.

18. The method of claim 1, wherein the turnover number is greater than or equal to 390.

19. The method of claim 1, wherein the concentration of tetrakis(triphenylphosphine)palladium(0) in the metal precursor solution is 0.002 M, the concentration of sodium tert-butoxide in the metal precursor solution is 1 M, the concentration of sodium formate in the metal precursor solution is 1.2 M, and the turnover number is greater than or equal to 340.

20. The method of claim 1, wherein the concentration of tetrakis(triphenylphosphine)palladium(0) in the metal precursor solution is 0.001 M, the concentration of sodium tert-butoxide in the metal precursor solution is 1 M, the concentration of sodium formate in the metal precursor solution is 1.2 M, and the turnover number is greater than or equal to 395.

* * * * *